US012568472B2

(12) United States Patent
Elshafie et al.

(10) Patent No.: US 12,568,472 B2
(45) Date of Patent: Mar. 3, 2026

(54) CHANNEL STATE INFORMATION REPORTING BASED ON SUB-RESOURCE POOLS FOR SIDELINK COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/158,459

(22) Filed: Jan. 23, 2023

(65) Prior Publication Data

US 2024/0260001 A1 Aug. 1, 2024

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0044* (2013.01); *H04W 72/0446* (2013.01); *H04W 72/0453* (2013.01); *H04W 72/25* (2023.01)

(58) Field of Classification Search
CPC ............... H04L 5/0044; H04W 72/02; H04W 72/0446; H04W 72/25
See application file for complete search history.

(56) References Cited

U.S. PATENT DOCUMENTS 10,271,306 B2 * 4/2019 Feng ...................... H04W 72/02
10,616,020 B2 * 4/2020 Lee .......................... H04L 27/26
(Continued)

FOREIGN PATENT DOCUMENTS

CN 111092673 A 5/2020
EP 3579633 A1 12/2019
(Continued)

OTHER PUBLICATIONS

Gu X., et al., "A Dynamic Geo-based Resource Selection Algorithm for LTE-V2V Communications", Eurasip Journal on Wireless Communications and Networking, Biomed Central Ltd, London, UK, vol. 2018, No. 186, Jul. 27, 2018, pp. 1-18, XP021258917, Paragraph [3.1.1].

(Continued)

*Primary Examiner* — Raj Jain
(74) *Attorney, Agent, or Firm* — Paul M. McAdams; Holland & Hart LLP

(57) ABSTRACT

Methods, systems, and devices for wireless communication are described. A first network node (e.g., a reduced capability user equipment (UE)) may receive first control information indicating a resource pool for sidelink communication with a second network node, the resource pool including a set of resources. The first network node may receive second control information indicating multiple, non-overlapping sub-resource pools of the resource pool, where each sub-resource pool may include one or more non-overlapping resources of the resource pool. In some cases, the second control information may indicate one or more frequency hopping patterns for sounding the sub-resource pools. The first network node may communicate (e.g., via sidelink) with the second network node based on one or more of the sub-resource pools. In some cases, the first network node may transmit a medium access control (MAC) control (Continued)

element (MAC-CE) indicating channel state information (CSI) for a corresponding sub-resource pool.

30 Claims, 16 Drawing Sheets

(51) Int. Cl.

| | | |
|---|---|---|
| *H04W 72/0446* | (2023.01) | |
| *H04W 72/0453* | (2023.01) | |
| *H04W 72/25* | (2023.01) | |

(56) References Cited

U.S. PATENT DOCUMENTS

| | | | |
|---|---|---|---|
| 2018/0110054 A1 | 4/2018 | Jung et al. | |
| 2019/0014598 A1* | 1/2019 | Yoshimura | ............ H04W 72/04 |
| 2021/0076236 A1 | 3/2021 | Kimura | |
| 2021/0143939 A1* | 5/2021 | Dong | .................... H04L 5/0035 |
| 2021/0297225 A1* | 9/2021 | Marinier | ............... H04L 1/0061 |
| 2022/0224482 A1* | 7/2022 | Kim | ...................... H04W 56/00 |
| 2023/0345495 A1* | 10/2023 | Liang | ................. H04W 72/566 |
| 2024/0260001 A1* | 8/2024 | Elshafie | ............... H04W 72/20 |

FOREIGN PATENT DOCUMENTS

| | | | |
|---|---|---|---|
| EP | 3621391 A1 | 3/2020 | |
| WO | 2015187276 A1 | 12/2015 | |

OTHER PUBLICATIONS

International Search Report and Written Opinion—PCT/US2024/010865—ISA/EPO—Apr. 30, 2024.

* cited by examiner

210 — [First control information]
First control information

215 — [Second control information]
Second control information

Figure 12:
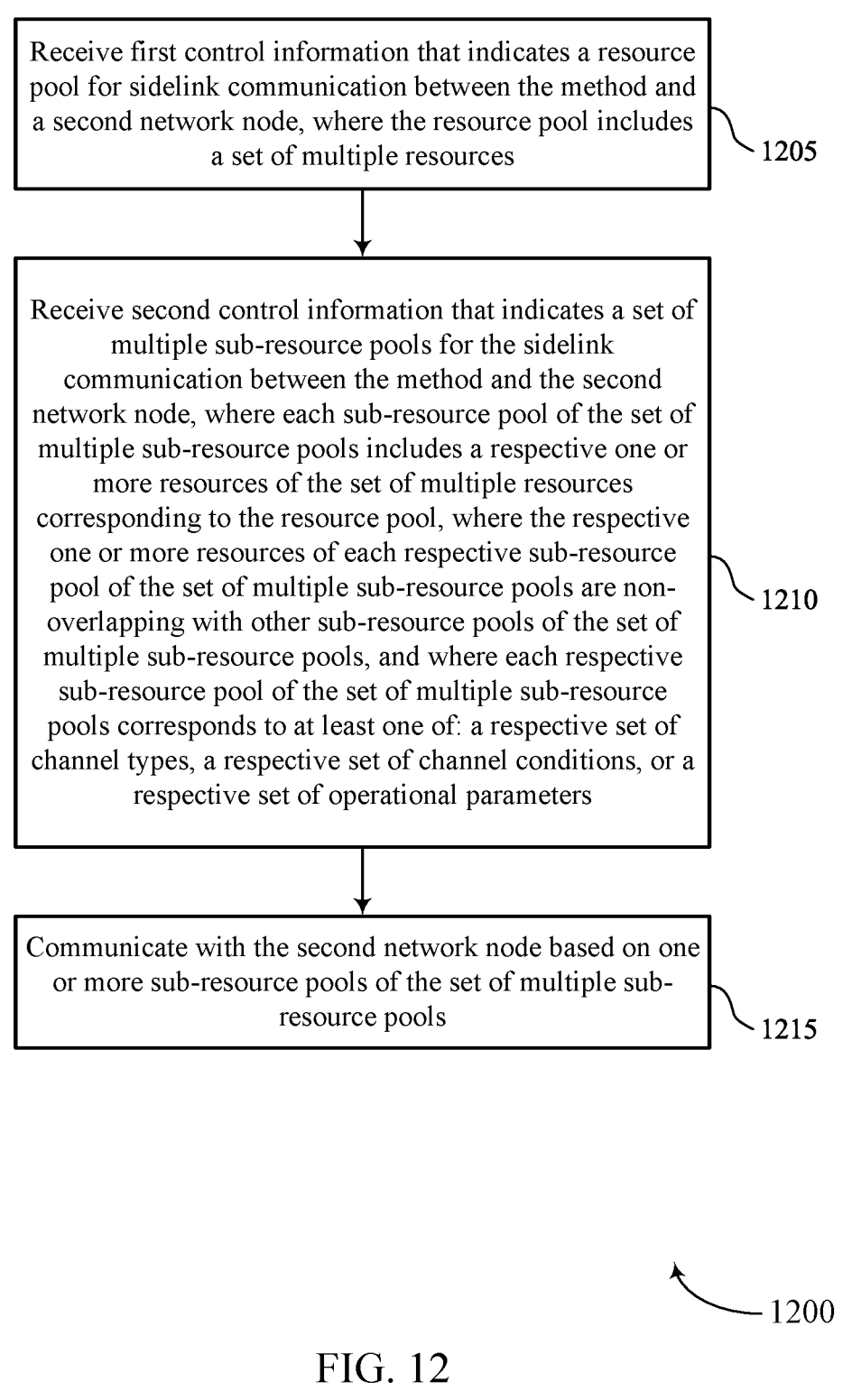

Receive first control information that indicates a resource pool for sidelink communication between the method and a second network node, where the resource pool includes a set of multiple resources ⟍ 1205

Receive second control information that indicates a set of multiple sub-resource pools for the sidelink communication between the method and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters ⟍ 1210

Communicate with the second network node based on one or more sub-resource pools of the set of multiple sub-resource pools ⟍ 1215

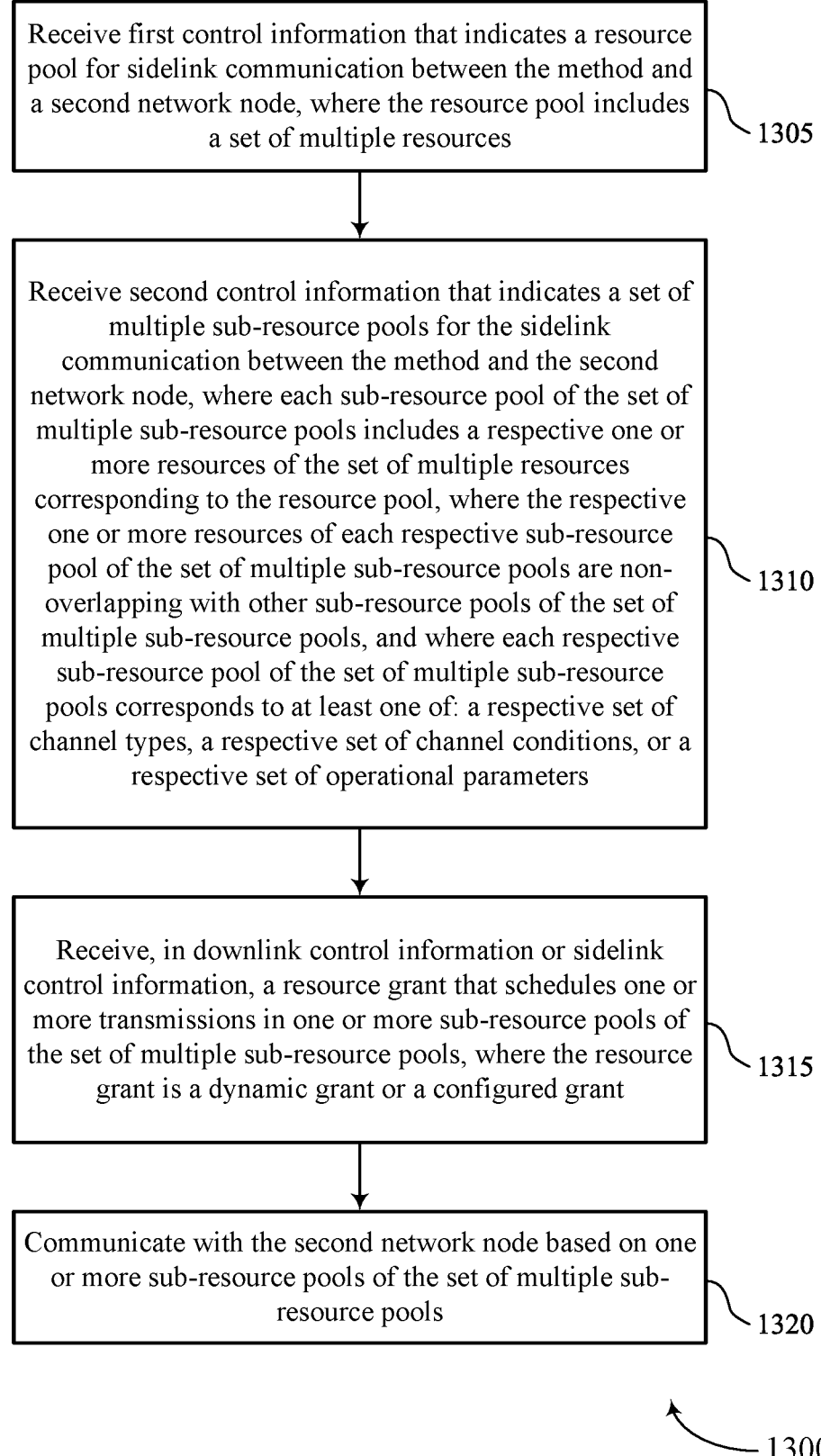

Receive first control information that indicates a resource pool for sidelink communication between the method and a second network node, where the resource pool includes a set of multiple resources ⌐ 1305

Receive second control information that indicates a set of multiple sub-resource pools for the sidelink communication between the method and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters ⌐ 1310

Receive, in downlink control information or sidelink control information, a resource grant that schedules one or more transmissions in one or more sub-resource pools of the set of multiple sub-resource pools, where the resource grant is a dynamic grant or a configured grant ⌐ 1315

Communicate with the second network node based on one or more sub-resource pools of the set of multiple sub-resource pools ⌐ 1320

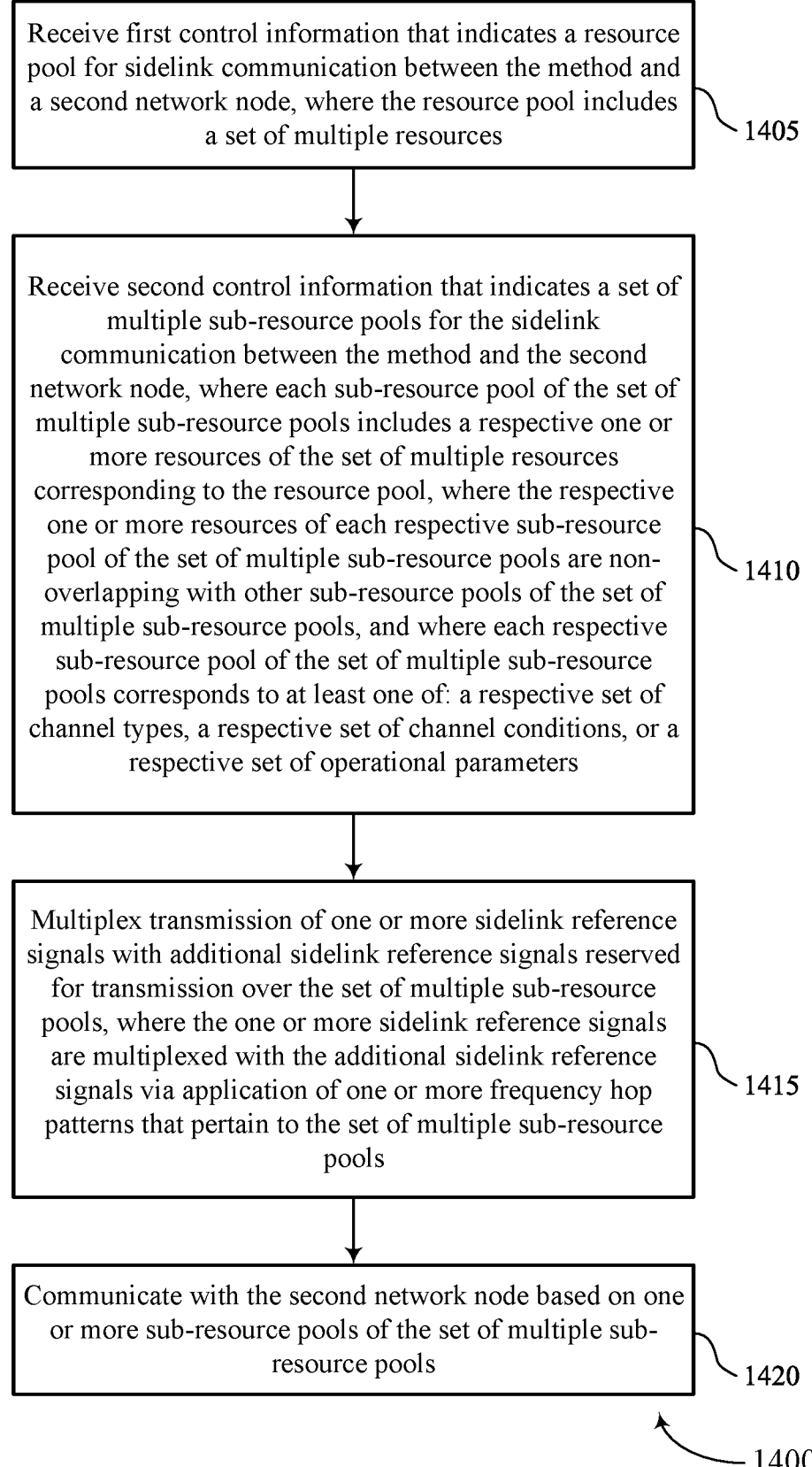

Receive first control information that indicates a resource pool for sidelink communication between the method and a second network node, where the resource pool includes a set of multiple resources

1405

Receive second control information that indicates a set of multiple sub-resource pools for the sidelink communication between the method and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters

1410

Multiplex transmission of one or more sidelink reference signals with additional sidelink reference signals reserved for transmission over the set of multiple sub-resource pools, where the one or more sidelink reference signals are multiplexed with the additional sidelink reference signals via application of one or more frequency hop patterns that pertain to the set of multiple sub-resource pools

1415

Communicate with the second network node based on one or more sub-resource pools of the set of multiple sub-resource pools

Figure 15:
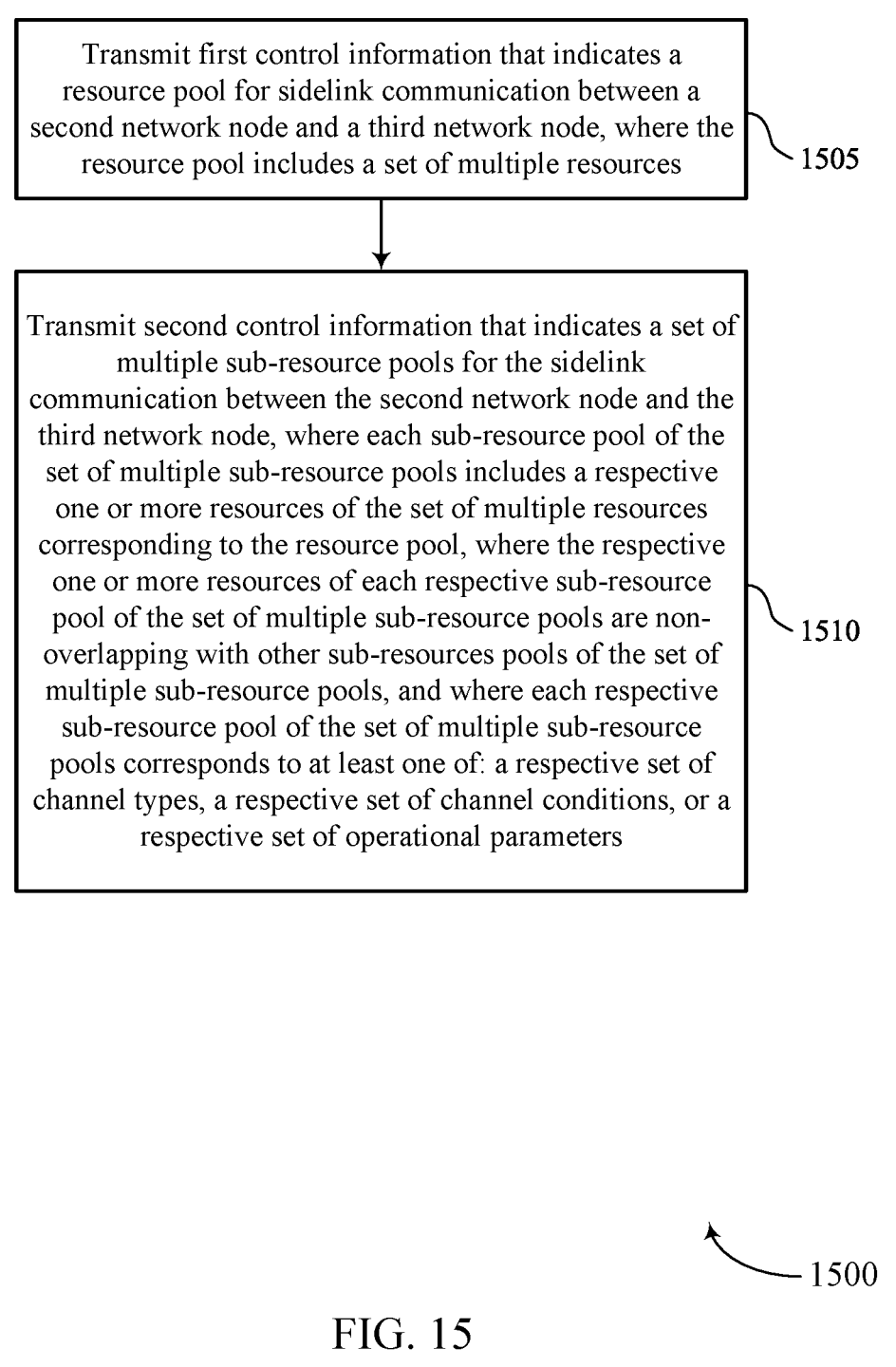

Transmit first control information that indicates a resource pool for sidelink communication between a second network node and a third network node, where the resource pool includes a set of multiple resources

1505

Transmit second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters

Figure 16:
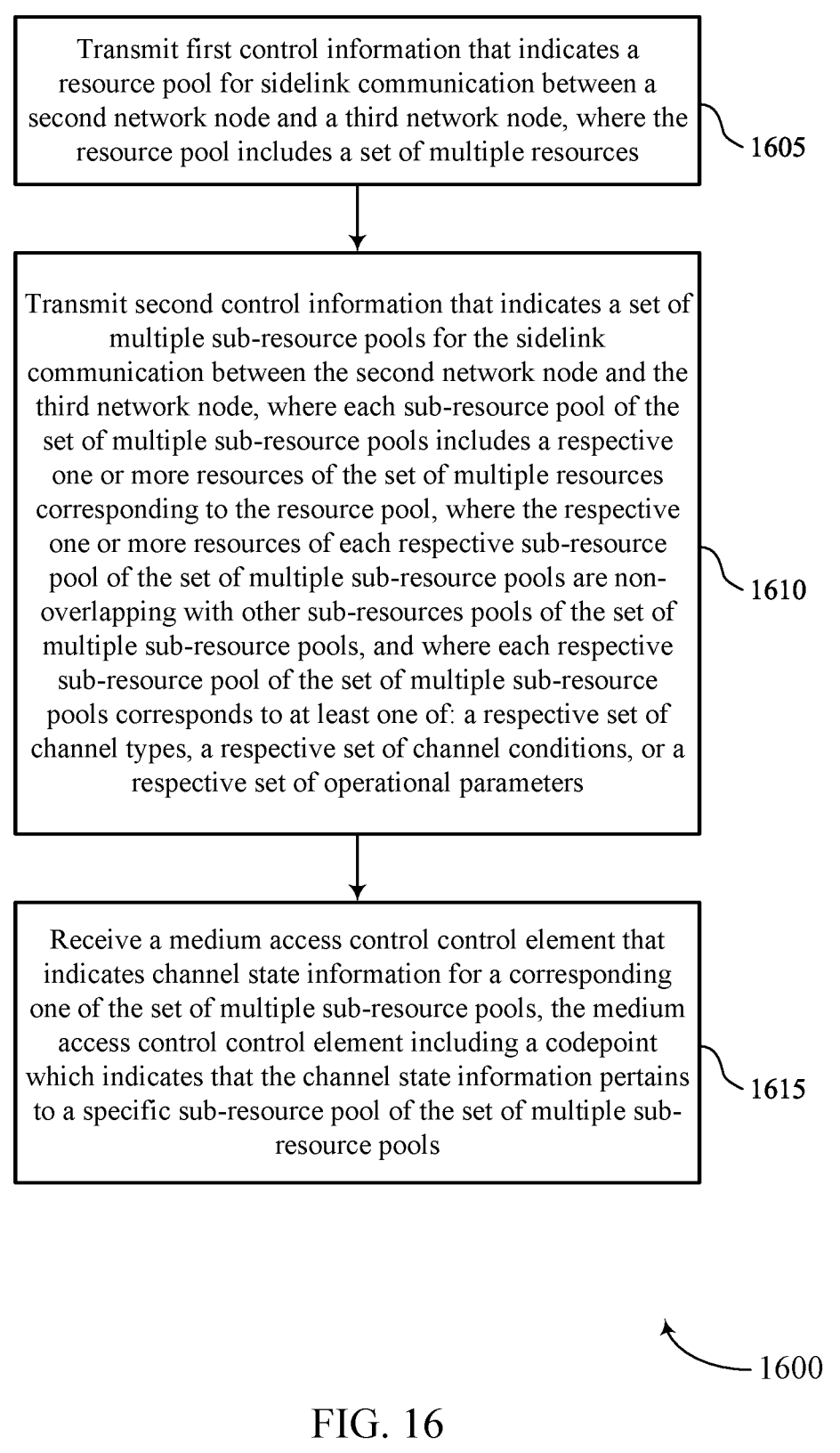

Transmit first control information that indicates a resource pool for sidelink communication between a second network node and a third network node, where the resource pool includes a set of multiple resources

1605

Transmit second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters

1610

Receive a medium access control control element that indicates channel state information for a corresponding one of the set of multiple sub-resource pools, the medium access control control element including a codepoint which indicates that the channel state information pertains to a specific sub-resource pool of the set of multiple sub-resource pools

CHANNEL STATE INFORMATION REPORTING BASED ON SUB-RESOURCE POOLS FOR SIDELINK COMMUNICATIONS

INTRODUCTION

The following relates to wireless communication, including channel state information (CSI) reporting based on sub-resource pools for sidelink communications. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel state information (CSI) reporting based on sub-resource pools for sidelink communications. For example, the described techniques provide for the use of sub-resource pools to improve multiplexing and CSI reporting for network nodes supporting sidelink communications. In some aspects, a user equipment (UE) (e.g., a first network node) may receive control information that indicates a resource pool for sidelink communication with other UEs. In addition, the UE may receive control information that indicates a set of multiple sub-resource pools for the sidelink communication, where the sub-resource pools may be non-overlapping portions of the resource pool. For example, if the resource pool includes a set of resources, each sub-resource pool may include a subset of the set of resources, where one or more resources in a sub-resource pool are non-overlapping, and where the sub-resources themselves are non-overlapping. Additionally, each sub-resource pool may correspond to a respective set of channel types, a respective set of channel conditions, or a respective set of operational parameters. The UE may communicate (e.g., participate in sidelink communications) with one or more other UEs (e.g., a second network node) using one or more of the sub-resource pools. For example, the UEs may communicate a sidelink reference signal and a CSI report (e.g., in a medium access control (MAC) control element (MAC-CE)) using the sub-resource pools.

A method for wireless communication at a first network node is described. The method may include receiving first control information that indicates a resource pool for sidelink communication between the method and a second network node, where the resource pool includes a set of multiple resources, receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters, and communicating with the second network node based on one or more sub-resource pools of the set of multiple sub-resource pools.

An apparatus for wireless communication at a first network node is described. The apparatus may include a memory, and at least one processor coupled to the memory, where the at least one processor is configured to receive first control information that indicates a resource pool for sidelink communication between the method and a second network node, where the resource pool includes a set of multiple resources, receive second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters, and communicate with the second network node based on one or more sub-resource pools of the set of multiple sub-resource pools.

Another apparatus for wireless communication at a first network node is described. The apparatus may include means for receiving first control information that indicates a resource pool for sidelink communication between the method and a second network node, where the resource pool includes a set of multiple resources, means for receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters, and means for communicating with the second network node based on one or more sub-resource pools of the set of multiple sub-resource pools.

A non-transitory computer-readable medium having code for wireless communication stored thereon. The code, when executed by a network node, may cause the first network node to receive first control information that indicates a resource pool for sidelink communication between the method and a second network node, where the resource pool includes a set of multiple resources, receive second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters, and communicate with the second network node based on one or more sub-resource pools of the set of multiple sub-resource pools.

In some examples of the method, apparatuses, and non-transitory computer-readable medium described herein, the second control information indicates one or more differences between the set of multiple sub-resource pools and the resource pool.

In some examples of the method, apparatuses, and non-transitory computer-readable medium described herein, the second control information indicates a respective size of each sub-resource pool of the set of multiple sub-resource pools, where the respective size of each sub-resource pool may be based on a capability of the method.

Some examples of the method, apparatuses, and non-transitory computer-readable medium described herein may further include operations, features, means, or instructions for transmitting, in a common resource pool that may be common to a set of multiple network nodes that includes the first network node and the second network node, information that indicates a change in a respective activation state of at least a respective one or more resources of each sub-resource pool.

In some examples of the method, apparatuses, and non-transitory computer-readable medium described herein, the common resource pool may be a primary resource pool associated with a primary component carrier, a primary sub-resource pool within the primary resource pool associated with the primary component carrier, or a secondary resource pool associated with a secondary component carrier.

Some examples of the method, apparatuses, and non-transitory computer-readable medium described herein may further include operations, features, means, or instructions for applying the change in the respective activation state based on respective acknowledgement (ACK) information from one or more network nodes of the set of multiple network nodes different from the first network node and the second network node.

In some examples of the method, apparatuses, and non-transitory computer-readable medium described herein, the information that indicates the change in the respective activation state may be indicative of a respective change in an activation state on a per-sub-resource pool basis.

Some examples of the method, apparatuses, and non-transitory computer-readable medium described herein may further include operations, features, means, or instructions for receiving, in downlink control information (DCI) or sidelink control information (SCI), a resource grant that schedules one or more transmissions in one or more sub-resource pools of the set of multiple sub-resource pools, where the resource grant may be a dynamic grant or a configured grant.

In some examples of the method, apparatuses, and non-transitory computer-readable medium described herein, receiving the resource grant in the DCI or the SCI may include operations, features, means, or instructions for receiving respective SCI corresponding to each respective transmission of the one or more transmissions that may be scheduled.

In some examples of the method, apparatuses, and non-transitory computer-readable medium described herein, the one or more transmissions scheduled in the one or more sub-resource pools include a sidelink channel transmission that may be scheduled across the one or more sub-resource pools, and where each of the one or more sub-resource pools may be associated with a respective redundancy version (RV) for the sidelink channel transmission.

Some examples of the method, apparatuses, and non-transitory computer-readable medium described herein may further include operations, features, means, or instructions for transmitting, in SCI, a resource grant that schedules one or more transmissions in one or more sub-resource pools of the set of multiple sub-resource pools, where the resource grant may be a dynamic grant or a configured grant.

Some examples of the method, apparatuses, and non-transitory computer-readable medium described herein may further include operations, features, means, or instructions for receiving information that indicates a change in an activation state of at least a respective one or more resources of each sub-resource pool of the set of multiple sub-resource pools.

Some examples of the method, apparatuses, and non-transitory computer-readable medium described herein may further include operations, features, means, or instructions for receiving, in DCI, a resource grant that schedules one or more transmissions in the one or more sub-resource pools, where the DCI includes, for each of the scheduled one or more transmissions, a respective sub-resource pool indication that indicates one or more time domain resource allocations (TDRAs) or one or more frequency domain resource allocations (FDRAs) and at least one of the set of multiple sub-resource pools for a respective transmission.

Some examples of the method, apparatuses, and non-transitory computer-readable medium described herein may further include operations, features, means, or instructions for receiving DCI configured to activate a respective one or more resources of each sub-resource pool of the set of multiple sub-resource pools such that a quantity of activated resources of each sub-resource pool may be less than a threshold amount, where the DCI indicates a resource pool index that corresponds to the resource pool and one or more sub-resource pool indices that correspond to the activated resources of each sub-resource pool.

In some examples of the method, apparatuses, and non-transitory computer-readable medium described herein, communicating with the second network node may include operations, features, means, or instructions for transmitting a sidelink transmission across at least one or more resources of the set of multiple sub-resource pools, where the at least one or more resources of the set of multiple sub-resource pools may be aligned to facilitate coherent transmission of the sidelink communication or may be offset from each other to avoid overlapping in time.

In some examples of the method, apparatuses, and non-transitory computer-readable medium described herein, communicating with the second network node may include operations, features, means, or instructions for receiving a sidelink transmission across at least one or more resources of the set of multiple sub-resource pools, where the at least one or more resources of the set of multiple sub-resource pools may be aligned to facilitate coherent transmission of the sidelink communication or may be offset from each other to avoid overlapping in time.

In some examples of the method, apparatuses, and non-transitory computer-readable medium described herein, communicating with the second network node may include operations, features, means, or instructions for transmitting one or more repetitions of data or one or more repetitions of transport blocks via different ones of the set of multiple sub-resource pools.

Some examples of the method, apparatuses, and non-transitory computer-readable medium described herein may further include operations, features, means, or instructions for receiving control information that schedules at least two different sets of configured grant transmissions across the set of multiple sub-resource pools, where the at least two different sets of configured grant transmissions may be associated with different TDRAs to prevent time domain overlapping between individual ones of the different sets of configured grant transmissions.

In some examples of the method, apparatuses, and non-transitory computer-readable medium described herein, communicating with the second network node may include operations, features, means, or instructions for communicating with the second network node in a first subset of the set of multiple sub-resource pools that may be different from a second subset of the set of multiple sub-resource pools, the second subset of the set of multiple sub-resource pools being allocated for use by network nodes that may have a lower power or a lower bandwidth with respect to the method.

In some examples of the method, apparatuses, and non-transitory computer-readable medium described herein, the respective set of channel types includes a physical sidelink shared channel, a physical sidelink control channel, or a physical sidelink feedback channel, and where the respective set of channel conditions includes a quantity of sub-channels, a subchannel size, or a starting resource block, and where the respective set of operational parameters includes parameters pertaining to a code block rate, a modulation and coding scheme (MCS), a sensing configuration, or power control.

In some examples of the method, apparatuses, and non-transitory computer-readable medium described herein, communicating with the second network node may include operations, features, means, or instructions for transmitting one or more sidelink reference signals in the set of multiple sub-resource pools based on one or more frequency hop patterns, where the set of multiple sub-resource pools may be sounded in a single slot or across a set of multiple slots in accordance with the one or more frequency hop patterns.

In some examples of the method, apparatuses, and non-transitory computer-readable medium described herein, the second control information indicates the one or more frequency hop patterns, where each frequency hop pattern of the one or more frequency hop patterns may be configured to sound multiple respective sub-resource pools of the set of multiple sub-resource pools.

In some examples of the method, apparatuses, and non-transitory computer-readable medium described herein, the second control information indicates the one or more frequency hop patterns, where each frequency hop pattern of the one or more frequency hop patterns may be associated with a single respective individual sub-resource pool of the set of multiple sub-resource pools.

Some examples of the method, apparatuses, and non-transitory computer-readable medium described herein may further include operations, features, means, or instructions for receiving third control information that includes a set of parameters for sidelink reference signal transmission on a per-sub-resource pool basis, where the set of parameters indicates a periodicity, a quantity of ports, a power offset relative to a channel, or any combination thereof.

In some examples of the method, apparatuses, and non-transitory computer-readable medium described herein, the second control information indicates a frequency gap between the set of multiple sub-resource pools based on a capability of the method.

Some examples of the method, apparatuses, and non-transitory computer-readable medium described herein may further include operations, features, means, or instructions for communicating a reservation request that indicates one or more frequency hop patterns to be applied to sidelink reference signals transmitted or received in the set of multiple sub-resource pools.

Some examples of the method, apparatuses, and non-transitory computer-readable medium described herein may further include operations, features, means, or instructions for multiplexing transmission of one or more sidelink reference signals with additional sidelink reference signals reserved for transmission over the set of multiple sub-resource pools, where the one or more sidelink reference signals may be multiplexed with the additional sidelink reference signals via application of one or more frequency hop patterns that pertain to the set of multiple sub-resource pools.

In some examples of the method, apparatuses, and non-transitory computer-readable medium described herein, a frequency hop pattern of the one or more frequency hop patterns may be associated with a source identifier, a destination identifier, a group common identifier, or an identifier indicated to the method.

Some examples of the method, apparatuses, and non-transitory computer-readable medium described herein may further include operations, features, means, or instructions for receiving third control information that includes a set of parameters that pertain to one or more CSI reports to be transmitted, values of the set of parameters being based on a quantity of sub-channels in corresponding ones of the set of multiple sub-resource pools.

Some examples of the method, apparatuses, and non-transitory computer-readable medium described herein may further include operations, features, means, or instructions for transmitting a MAC-CE that indicates CSI for a corresponding one of the set of multiple sub-resource pools, the MAC-CE including a codepoint which indicates that the CSI pertains to a specific sub-resource pool of the set of multiple sub-resource pools.

In some examples of the method, apparatuses, and non-transitory computer-readable medium described herein, the codepoint may be included within reserved bit fields of the MAC-CE.

In some examples of the method, apparatuses, and non-transitory computer-readable medium described herein, transmitting the MAC-CE may include operations, features, means, or instructions for transmitting, via the MAC-CE, multiple sets of CSI for corresponding ones of the set of multiple sub-resource pools, each set of CSI including a respective channel quality indicator (CQI), a respective rank indicator (RI), or both.

Some examples of the method, apparatuses, and non-transitory computer-readable medium described herein may further include operations, features, means, or instructions for transmitting multiple CSI reports concurrently based on a capability of the method and a quantity of sub-channels or resources in each of the set of multiple sub-resource pools.

In some examples of the method, apparatuses, and non-transitory computer-readable medium described herein, transmitting the multiple CSI reports may include operations, features, means, or instructions for transmitting a MAC-CE that includes a header and one or more bits that indicates CSI for each of the set of multiple sub-resource pools, where the header indicates the set of multiple sub-resource pools for which the CSI may be reported.

A method for wireless communication is described. The method may include transmitting first control information that indicates a resource pool for sidelink communication between a second network node and a third network node, where the resource pool includes a set of multiple resources and transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

An apparatus for wireless communication is described. The apparatus may include a memory, and at least one processor coupled to the memory, where the at least one processor is configured to transmit first control information that indicates a resource pool for sidelink communication between a second network node and a third network node, where the resource pool includes a set of multiple resources and transmit second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

Another apparatus for wireless communication is described. The apparatus may include means for transmitting first control information that indicates a resource pool for sidelink communication between a second network node and a third network node, where the resource pool includes a set of multiple resources and means for transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

A non-transitory computer-readable medium having code for wireless communication stored thereon. The code, when executed by a network node, may cause the first network node to transmit first control information that indicates a resource pool for sidelink communication between a second network node and a third network node, where the resource pool includes a set of multiple resources and transmit second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

In some examples of the method, apparatuses, and non-transitory computer-readable medium described herein, the second control information indicates one or more differences between the set of multiple sub-resource pools and the resource pool.

In some examples of the method, apparatuses, and non-transitory computer-readable medium described herein, the second control information may be indicates a respective size of each sub-resource pool of the set of multiple sub-resource pools, where the respective size of each sub-resource pool may be based on a capability of the second network node.

Some examples of the method, apparatuses, and non-transitory computer-readable medium described herein may further include operations, features, means, or instructions for transmitting, in DCI or SCI, a resource grant that schedules one or more transmissions in one or more sub-resource pools of the set of multiple sub-resource pools, where the resource grant may be a dynamic grant or a configured grant.

Some examples of the method, apparatuses, and non-transitory computer-readable medium described herein may further include operations, features, means, or instructions for transmitting information that indicates a change in an activation state of at least a respective one or more resources of each sub-resource pool of the set of multiple sub-resource pools.

Some examples of the method, apparatuses, and non-transitory computer-readable medium described herein may further include operations, features, means, or instructions for transmitting, in DCI, a resource grant that schedules one or more transmissions in one or more sub-resource pools of the set of multiple sub-resource pools, where the DCI includes, for each of the scheduled one or more transmissions, a respective sub-resource pool indication that indicates one or more TDRAs or one or more FDRAs and at least one of the set of multiple sub-resource pools for a respective transmission.

Some examples of the method, apparatuses, and non-transitory computer-readable medium described herein may further include operations, features, means, or instructions for transmitting DCI configured to activate a respective one or more resources of each sub0resource pool of the set of multiple sub-resource pools such that a quantity of activated resources of each sub-resource pool may be less than a threshold amount, where the DCI indicates a resource pool index that corresponds to the resource pool and one or more sub-resource pool indices that correspond to the activated resources of each sub-resource pool.

Some examples of the method, apparatuses, and non-transitory computer-readable medium described herein may further include operations, features, means, or instructions for transmitting control information that schedules at least two different sets of configured grant transmissions across the set of multiple sub-resource pools, where the at least two different sets of configured grant transmissions may be associated with different TDRAs to prevent time domain overlapping between individual ones of the different sets of configured grant transmissions.

Some examples of the method, apparatuses, and non-transitory computer-readable medium described herein may further include operations, features, means, or instructions for transmitting third control information that includes a set of parameters for sidelink reference signal transmission on a per-sub-resource pool basis, where the set of parameters indicates a periodicity, a quantity of ports, a power offset relative to a channel, or any combination thereof.

In some examples of the method, apparatuses, and non-transitory computer-readable medium described herein, the second control information indicates a frequency gap between the set of multiple sub-resource pools based on a capability of the second network node.

Some examples of the method, apparatuses, and non-transitory computer-readable medium described herein may further include operations, features, means, or instructions for transmitting third control information that includes a set of parameters that pertain to one or more CSI reports to be transmitted, values of the set of parameters being based on a quantity of sub-channels in corresponding ones of the set of multiple sub-resource pools.

Some examples of the method, apparatuses, and non-transitory computer-readable medium described herein may further include operations, features, means, or instructions for receiving a MAC-CE that indicates CSI for a corresponding one of the set of multiple sub-resource pools, the MAC-CE including a codepoint which indicates that the CSI pertains to a specific sub-resource pool of the set of multiple sub-resource pools.

In some examples of the method, apparatuses, and non-transitory computer-readable medium described herein, the codepoint may be included within reserved bit fields of the MAC-CE.

In some examples of the method, apparatuses, and non-transitory computer-readable medium described herein, receiving the MAC-CE may include operations, features, means, or instructions for receiving, via the MAC-CE, multiple sets of CSI for corresponding ones of the set of multiple sub-resource pools, each set of CSI including a respective CQI, a respective RI, or both.

Some examples of the method, apparatuses, and non-transitory computer-readable medium described herein may further include operations, features, means, or instructions for receiving multiple CSI reports concurrently based on a capability of the method and a quantity of sub-channels or resources in each of the set of multiple sub-resource pools.

In some examples of the method, apparatuses, and non-transitory computer-readable medium described herein, receiving the multiple CSI reports may include operations, features, means, or instructions for receiving a MAC-CE that includes a header and one or more bits that indicates CSI for each of the set of multiple sub-resource pools, where the header indicates the set of multiple sub-resource pools for which the CSI may be reported.

BRIEF DESCRIPTION OF THE DRAWINGS

FIGS. 12 through 16 illustrate flowcharts showing methods that support CSI reporting based on sub-resource pools for sidelink communications in accordance with one or more aspects of the present disclosure.

DETAILED DESCRIPTION

User equipments (UEs), including power-saving UEs (e.g., reduced capability (RedCap) UEs) may perform sidelink communications using one or more resource pools. In some aspects, each sub-band of a resource pool may be configured or otherwise associated with a mode of operation (e.g., full sensing, partial sensing, etc.), which may result in challenges when multiplexing UEs with different operation modes. Additionally, some sidelink UEs may support channel state information (CSI) reporting, for which a UE may use bandwidth adaptation by splitting a resource pool into disjoint sets of resources to transmit a CSI report. However, given a limited operational bandwidth of some power-saving UEs, the UEs may be unable to perform channel sensing over an entire bandwidth of a resource pool.

The techniques described herein support the use of sub-resource pools to improve multiplexing and CSI reporting for UEs supporting sidelink communications. In some aspects, a UE (e.g., a first network node) may receive control information that indicates a resource pool for sidelink communication with other UEs. In addition, the UE may receive control information that indicates a set of multiple sub-resource pools for the sidelink communication, where the sub-resource pools may be non-overlapping portions of the resource pool. For example, if the resource pool includes a set of resources, each sub-resource pool may include a subset of the set of resources, where one or more resources in a sub-resource pool are non-overlapping, and where the sub-resources themselves are non-overlapping. Additionally, each sub-resource pool may correspond to a respective set of channel types, a respective set of channel conditions, or a respective set of operational parameters. The UE may communicate (e.g., participate in sidelink communications) with one or more other UEs (e.g., a second network node) using one or more of the sub-resource pools. For example, the UEs may communicate a sidelink reference signal and a CSI report (e.g., in a medium access control (MAC) control element (MAC-CE)) using the sub-resource pools.

Aspects of the disclosure are initially described in the context of wireless communications systems. Aspects of the disclosure are then described in the context of resource pool and sub-resource pool configurations, MAC-CEs, and process flows. Aspects of the disclosure are further illustrated by and described with reference to apparatus diagrams, system diagrams, and flowcharts that relate to CSI reporting based on sub-resource pools for sidelink communications.

Figure 1:
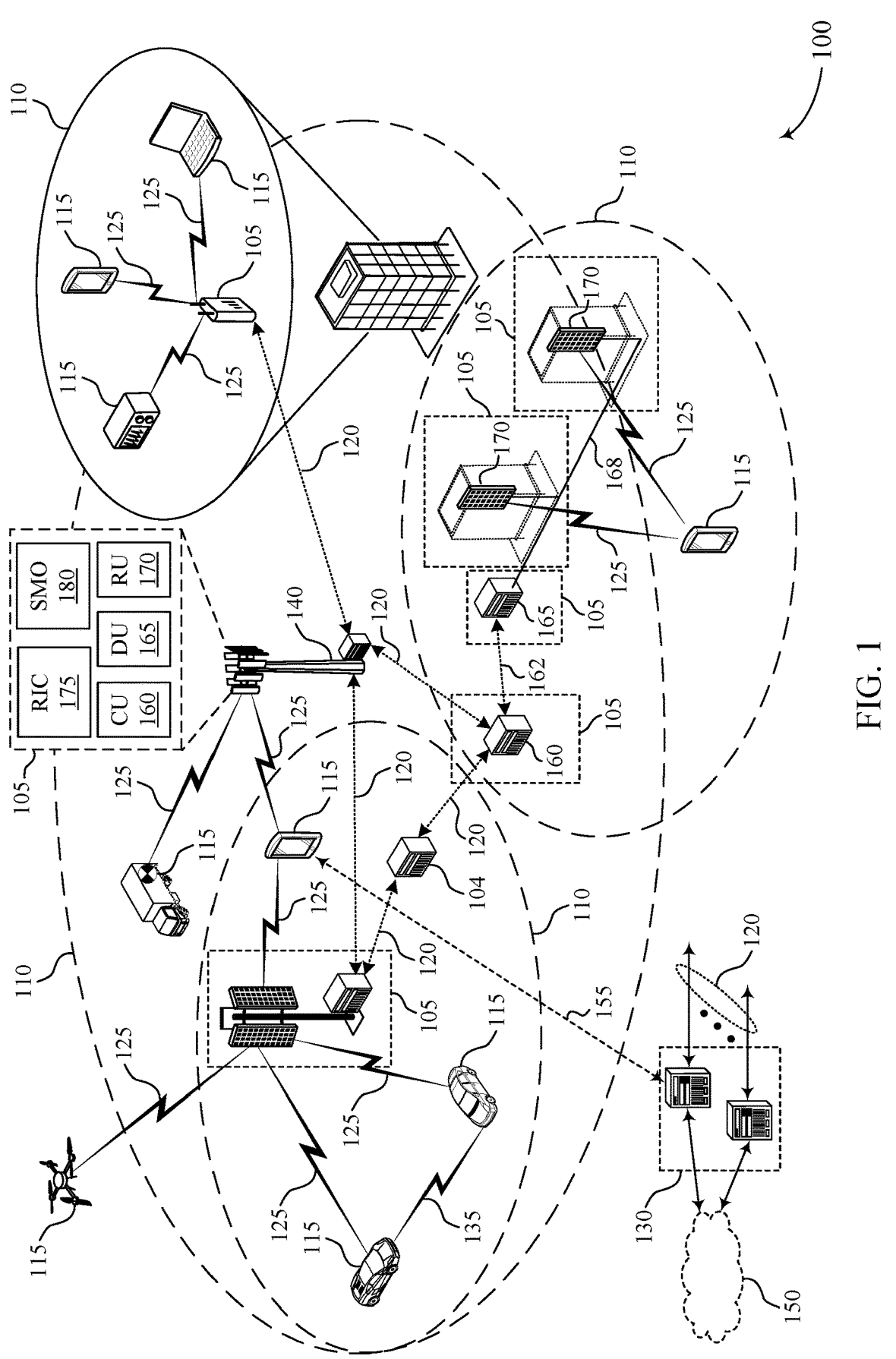
FIG. 1 illustrates an example of a wireless communications system that supports channel state information (CSI) reporting based on sub-resource pools for sidelink communications in accordance with one or more aspects of the present disclosure.

FIG. 1 illustrates an example of a wireless communications system 100 that supports CSI reporting based on sub-resource pools for sidelink communications in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support CSI reporting based on sub-resource pools for sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station

140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 (e.g., an NR wireless communications system) may support RedCap or low-power wireless devices (e.g., metering devices, asset tracking devices, personal IoT or wearable devices, and the like) to increase system efficiency, reduce latency, and improve reliability, among other benefits. In some aspects, such wireless devices may support low-power sidelink communications and operation modes.

Sidelink communications may occur via a set of time and frequency resources defined by a resource pool. In the frequency domain, a sidelink resource pool may include a quantity of contiguous sub-channels (e.g., numSubchannel), where a sub-channel may include a quantity of contiguous physical resource blocks (PRBs) (e.g., subchannelsize), and where the quantities of contiguous sub-channels and contiguous PRBs may be higher layer parameters. In some aspects, a network entity 105 (e.g., a network node) may configure a UE 115 (e.g., a network node) via higher layer signaling with one or more sidelink resource pools. The UE 115 may use the sidelink resource pools for transmission or reception of a physical shared sidelink channel (PSSCH), where the sidelink resource pools may be associated with one of multiple sidelink resource allocation modes. For a first sidelink resource allocation mode (e.g., mode 1), a network entity 105 may dynamically indicate the sidelink resource pools (e.g., via downlink control information (DCI) format 3_0) or the network entity 105 may configure the sidelink resource pools. In addition, the first sidelink resource allocation mode may support both Type 1 (e.g., configuration-based) and Type 2 (e.g., activation-based) sidelink resource configurations.

A second sidelink resource allocation mode (e.g., mode 2) may be an autonomous mode in which a UE 115 may select resource pools or resources for sidelink communications based on sensing and reservation procedures. For example, a UE 115 may attempt to decode sidelink control information (SCI) received from multiple other UEs 115 in a sensing window. Each UE 115 may attempt to reserve resources in the future that may collide with a resource selection window of interest for the receiving UE 115. Based on a priority of a packet of the UE 115 of interest, $p_i$, a priority of a packet for which another UE 115 is reserving a resource, $p_j$, a configured reference signal received power (RSRP) for the $(p_i, p_j)$ pair, and an RSRP measured by the UE 115 of interest (based on reception of a PSSCH or a physical shared control channel (PSCCH)) from the other UE 115), the UE 115 of interest may determine whether a candidate resource is considered available. In some cases, one BWP may include multiple receiving and transmitting resource pools, and physical layer channels may be configured per resource pool.

In some cases, RedCap or power-saving UEs 115 may utilize resource pools differently than other wireless devices. For example, if a full-capability or full-power UE 115 reserves some resources in a portion of a resource pool that may be accessed (e.g., seen) by one or more RedCap UEs 115 (external to the resource pool), the RedCap UEs 115 may refrain from considering this reservation when they perform their own resource reservation. If reservations made by the full-capability UEs 115 are signaled in some portion of the resource pool, however, the sensing and reservation for the RedCap UE 115 may remain unaffected. Alternatively, reservations made by RedCap UEs 115 may be accessed by full-capability UEs 115 as the full-capability UEs 115 support larger bandwidths than the RedCap UEs 115.

In some aspects, a UE 115 may transmit data packets with different cast types in a given segmented resource pool. For example, the UE 115 may transmit a packet in a unicast, groupcast, or broadcast manner. For connection-less groupcast and for broadcast, an unknown set of UEs 115 may receive the transmitted packets. That is, the UEs 115 may lack a PC5 link. As a result, the UEs 115 may lack the ability to modify the segmented resource pool for transmission or reception over time.

For a resource pool partitioned into multiple sub-bands, a network entity 105 may preconfigure the cast types for each of the multiple sub-bands. For example, the network entity 105 may preconfigure some sub-bands to enable groupcast (e.g., connection-less groupcast) or broadcast, or to enable unicast or managed groupcast. Additionally, the network entity 105 may preconfigure one sub-band with a single cast type or multiple cast types. For broadcast and groupcast, a selection of which sub-band to use may be dependent on the application or service.

Additionally, or alternatively, the network entity 105 may preconfigure each sub-band of a resource pool with a mode of operation (e.g., full sensing, partial sensing, or random selection). In this way, UEs 115 with different operation modes may be multiplexed. For example, a full sensing UE 115 that is operating over an entire band may select resources from sub-bands that may not be assigned for UEs 115 with random selection, thereby minimizing an impact on UEs 115 using random selection. In addition, the full sensing UEs 115 may avoid collisions with the UEs 115 using random selection. For example, for high priority packets, full sensing UEs 115 may transmit in sub-bands where other UEs 115 may perform sufficient sensing.

Some sidelink UEs 115 may support CSI reporting, where a UE 115 may transmit a sidelink CSI-RS within a unicast PSSCH transmission if CSI reporting is enabled by a higher layer parameter sl-CSI-Acquisition and if a 'CSI request' field in a corresponding SCI format 0-2 is set to 1. For a CSI-RS transmission, higher layer signaling may also configure a quantity of ports (e.g., nrofPortsCSIRS-SL, which indicates a quantity of ports for sidelink CSI-RS for one or two antennas), a first symbol (e.g., firstSymbolInTimeDomainCSIRS-SL, which indicates a first OFDM symbol in a PRB used for sidelink CSI-RS transmissions), and a frequency domain allocation for sidelink CSI-RS transmissions (e.g., frequDomainAllocationCSIRS-SL). In some cases, a UE 115 may support a CSI-RS density of 1 (e.g., resource element, port, resource block). Additionally, a CSI report may include a channel quality indicator (CQI) and a rank indicator (RI) associated with the CSI.

In some cases, the UE 115 may calculate CSI parameters (if reported) based on dependencies between the CSI parameters. For example, the UE 115 may calculate a CQI based on a reported RI. In addition, CSI reporting may be periodic such that the CSI reporting may be triggered for CSI-RS configurations. In some aspects of CSI reporting, the UE 115 may support wideband CQI reporting, where the UE 115 may report a wideband CQI for an entire CSI reporting band, which may be limited to a PSSCH transmission band.

The UE 115 may transmit a sidelink CSI report via a MAC-CE. A sidelink CSI reporting MAC-CE may be identified by a MAC subheader with a particular logical channel identifier (LCID). In some aspects, a priority of the sidelink CSI reporting MAC-CE may be fixed to 1. The MAC-CE may include an RI field, a CQI field, and one or more reserved bits (e.g., R). The RI field may indicate a derived value of an RI for sidelink CSI reporting and may have a field length of one bit. The CQI field may indicate a derived value of a CQI for sidelink CSI reporting, and may have a field length of four bits. Each reserved bit may be set to zero.

A UE 115 triggering CSI reporting may be unable to trigger other aperiodic CSI reporting for the same UE 115 before a last slot of an expected reception or completion of an ongoing, aperiodic CSI report. The CSI report may be associated with the SCI format 2-A and have a 'CSI request' field set to 1, where a last slot of the expected reception of the ongoing aperiodic CSI report may be defined for the UE 115. To manage a sidelink CSI reporting procedure, a network entity 105 may transmit RRC signaling configuring a CSI reporting parameter (e.g., sl-LatencyBound-CSI-Report), which the network entity 105 may maintain for each PC5-RRC connection (e.g., with a support range of {3, . . . 160} slots).

A MAC entity may trigger or cancel sidelink CSI reporting for each pair of a source layer-2 identifier and a destination layer-2 identifier corresponding to a PC5-RRC connection which may be established by an upper layer. For example, if some SCI has triggered sidelink CSI reporting (which is yet to be canceled), and if a UE 115 is unable to meet a latency requirement of the sidelink CSI reporting in the sl-LatencyBound-CSI-Report parameter, then the network entity 105 may cancel the triggered sidelink CSI reporting. Alternatively, if the SCI has triggered the sidelink CSI reporting (which is yet to be canceled), and if the MAC entity indicates sidelink resources allocated for a new transmission, where sidelink shared channel resources may accommodate the sidelink CSI reporting MAC-CE and its subheader as a result of logical channel prioritization, then the MAC entity may instruct a multiplexing and assembly procedure to generate a sidelink CSI reporting MAC-CE and cancel the triggered sidelink CSI reporting. Alternatively, if the SCI has triggered sidelink CSI reporting (which is yet to be canceled), and if the network entity has configured the MAC entity with a first sidelink resource allocation mode (e.g., mode 1), then the MAC entity may trigger a scheduling request. In some aspects, if configured with the first sidelink resource allocation mode, the MAC entity may trigger a scheduling request if transmission of a pending sidelink CSI report with one or more sidelink grants is unable to meet a latency requirement associated with the sidelink CSI reporting.

To improve resource efficiency for both the first and second sidelink resource allocation modes, the network entity 105 may enable an enhanced CSI acquisition using wideband reference signals. For example, the network entity 105 may set aside a set of symbols or resource elements per sidelink slot or full sidelink slots for wideband sidelink reference signals on a per-resource pool basis. In some cases, a resource pool configuration may allocate a quantity of symbols at an end of some sidelink slots to TDM data and sidelink reference signals or a quantity of resource elements in some sidelink slots. Alternatively, a resource pool configuration may fully allocate a quantity of slots to sidelink reference signals. In some aspects, some slots may be identified as unavailable for sidelink communications. For example, a sidelink reference signal configuration may be limited to a sidelink BWP unrestricted to any of the resource pools provided to a UE 115, or may be suitable for network-controlled CSI acquisition but may be challenging for UE-autonomous CSI acquisition. Alternatively, some slots fully allocated to sidelink reference signals may be associated with a resource pool in which case PSFCH resources may be present in the slots.

In some cases, the network entity 105 may provide multiple reference signal configurations for a resource pool. For example, a first UE 115 may reserve the first two symbols of a resource pool over a first bandwidth (e.g., W1). Other UEs 115 may be unable to reserve reference signal symbols based on the configuration over the same first bandwidth. In some aspects, once the network entity 105 provides a configuration for a resource pool, sidelink UEs 115 may rate-match their transmission and reception based on the configured resource pool. In this way, receiving UEs 115 may assume that any received transmissions are rate-matched, as it may be inefficient if UEs 115 that transmit and receive sidelink reference signals using same overlapping resources are not close. In some aspects, sidelink reference signal transmissions may be independent of data transmissions and may be periodic or aperiodic based on a request from a network entity 105 or a relay or remote UE 115. For example, a remote UE 115 may transmit a sidelink reference signal to a primary UE 115, or a primary or relay UE 115 may transmit the sidelink reference signal followed by a report from the remote UE 115.

The wireless communications system 100 may support techniques for sidelink CSI reporting based on sub-resource pools. For example, the wireless communications system 100 may support lower layer (e.g., layer 1 (L1), layer 2 (L2), and layer 3 (L3)) signaling, grants, and resource configurations for measuring and reporting CSI based on sub-resource pools. In addition, the wireless communications system 100 may support a MAC-CE for CSI reporting based on the sub-resource pools. In some aspects, the UE 115 may receive control information indicating a resource pool for sidelink communication between two UEs 115 (e.g., network nodes) and indicating a set of sub-resource pools of the resource pool for the sidelink communication. The one or more sub-resource pools may be non-overlapping, and may each include one or more non-overlapping resources. Additionally, each sub-resource pool may correspond to one or more of a respective set of channel types, a respective set of channel conditions, a respective set of operational parameters. The UEs 115 may communicate (e.g., participate in sidelink communications) based on one or more of the sub-resource pools.

Figure 2:
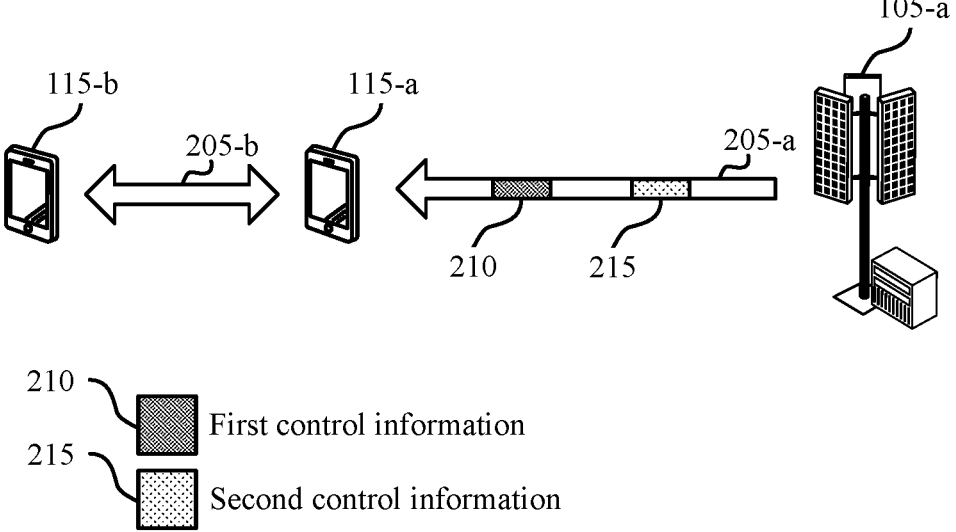
FIG. 2 illustrates an example of a wireless communications system that supports CSI reporting based on sub-resource pools for sidelink communications in accordance with one or more aspects of the present disclosure.
Figure 2:

FIG. 2 illustrates an example of a wireless communications system 200 that supports CSI reporting based on sub-resource pools for sidelink communications in accordance with one or more aspects of the present disclosure. In some aspects, the wireless communications system 200 may implement aspects of the wireless communications system 100 or may be implemented by aspects of the wireless communications system 100. For example, the wireless communications system 200 may include a UE 115-*a*, a UE 115-*b*, and a network entity 105-*a*, which may be examples of corresponding devices described herein. The UEs 115 and the network entity 105-*a* may also be referred to herein as network nodes. In some aspects, the network entity 105-*a* may enable the UE 115-*a* to communicate (e.g., perform sidelink communications with) the UE 115-*b* based on one or more sub-resource pools of a resource pool.

The wireless communications system 200 may support communications between the UEs 115 and the network entity 105-*a*. In some cases, the UE 115-*a* may communicate with the network entity 105-*a* via a communication link 205-*a*, which may be an example of a communication link 125 described with reference to FIG. 1. For example, the network entity 105-*a* may transmit downlink transmissions to the UE 115-*a* via the communication link 205-*a*. In addition, the UE 115-*a* and the UE 115-*b* may communicate via the communications link 205-*b*, which may be an example of a sidelink communication link.

To enable CSI reporting for the UE 115-*a* performing sidelink communications based on sub-resource pools, the network entity 105-*a* may transmit control information 210 (e.g., first control information) to the UE 115-*a* that may indicate a resource pool for sidelink communication between the UE 115-*a* (e.g., a first network node) and the UE 115-*b* (e.g., a second network node). In some aspects, the network entity 105-*a* may transmit the control information 210 via RRC signaling. The resource pool may include a set of multiple resources, which may be divided among multiple sub-resource pools.

The network entity 105-*a* may transmit control information 215 (e.g., second control information) to the UE 115-*a* that may indicate a set of multiple sub-resource pools of the resource for the sidelink communication. Each sub-resource pool may include a respective one or more resources of the set of multiple resources corresponding to the resource pool. In addition, the respective one or more resources of each respective sub-resource pool may be non-overlapping with other sub-resource pools. That is, the sub-resource pools and the resources included in each sub-resource pool may be non-overlapping such that resources may not be shared between sub-resource pools.

Each respective sub-resource pool may correspond to at least one of a respective set of channel types, a respective set of channel conditions, or a respective set of operational parameters. For example, a sub-resource pool may correspond to a PSSCH, a PSCCH, or a PSFCH. Additionally, or alternatively, the sub-resource pool may correspond to some quantity of subchannels, a subchannel size, or a particular starting resource block. Additionally, or alternatively, the sub-resource pool may correspond to a constant bit rate (CBR), an MCS, a sensing configuration, or a power control parameter.

In some aspects, the network entity 105-*a* may transmit the control information 215 via RRC signaling. That is, the control information 215 may include one RRC configuration per sub-resource pool, or at least a delta RRC configuration relative to an original resource pool configuration for each sub-resource pool. That is, the control information 215 may indicate one or more differences between the set of multiple sub-resource pools and the resource pool. In addition, the control information 215 may indicate a respective size of each sub-resource pool (e.g., a quantity of resources included in each sub-resource pool), which may be based on associated UE capabilities (e.g., whether the UEs 115 are RedCap UEs). The respective sizes of each sub-resource pool may be the same or different. In some aspects, the UE 115-*a* may activate or deactivate one or more of the multiple sub-resource pools. That is, in addition to the network entity 105-*a* transmitting the control information 215, the UE 115-*a* may indicate the set of multiple sub-resource pools (e.g., the information included in the control information 215) to the UE 115-*b* and any other UEs 115 RRC-connected with the UE 115-*a*.

In some cases, there may be a common sub-resource pool, similar to a primary resource pool or a primary component carrier, that the UE 115-*a* may use to receive all indications of activations, deactivations, or reactivations of sub-resources pools within the resource pool. For example, the UE 115-*a* may transmit, in a common resource pool that is common to a set of network nodes that includes at least the UE 115-*a* and the UE 115-*b*, information that indicates a change in a respective activation state (e.g., activated, deactivated, reactivated) of at least a respective one or more resources of each sub-resource pool. In some aspects, the common resource pool may be a primary resource pool associated with a primary component carrier, a primary sub-resource pool within the primary resource pool associated with the primary component carrier, or a secondary resource pool associated with a secondary component carrier.

The process of activating, deactivating, or reactivating one or more sub-resource pools may be associated with an ACK or NACK message such that any UE 115 wirelessly connected with the UE 115-*a* may be aware of the activation state. The change in the respective activation state of one or more sub-resource pools may be applied based on respective acknowledgement (ACK) information (e.g., ACK/NACK messages) from one or more other network nodes other than the UE 115-*a* or the UE 115-*b* (e.g., the network entity 105-*a*). For example, a network node may transmit an ACK message if a sub-resource pool is activated or reactivated and a NACK message if a sub-resource pool is deactivated. In this way, the information (e.g., ACK/NACK signaling) that indicates the change in the respective activation states may be indicative of a respective change in the activation state on a per-sub-resource pool basis. The UE 115-*a* and the UE 115-*b* may communicate based on the sub-resource pools that are activated. In some cases, a deactivation request (e.g., a request to deactivate one or more sub-resource pools) may be transmitted via lower layer signaling (e.g., L1, L2, or L3 signaling) per-sub-resource pool. In some aspects, the network entity 105-a or the UE 115-b (e.g., a primary UE) may activate, reactivate, or deactivate a single sub-resource pool using L1, L2, or L3 signaling. That is, the UE 115-a may receive information that indicates a change in an activation state of at least a respective one or more resources of each sub-resource pool.

In some examples, the UE 115-a may receive control information that schedules transmissions in one or more of the sub-resource pools. For example, the UE 115-a may receive DCI from the network entity 105-a or SCI (e.g., SCI 1 or SCI 2) from the UE 115-b or another UE 115 that may include a resource grant, the resource grant scheduling one or more transmissions in one or more of the sub-resource pools. The resource grant may be a dynamic grant, which may schedule the transmissions based on activation states of the one or more sub-resource pools. Alternatively, the resource grant may be a configured grant, which may pre-allocate resources and sub-resource pools for uplink or sidelink transmissions by the UE 115-a. In some aspects, RRC signaling or DCI (e.g., type 1 or 2) may activate a same configured grant across one or more sub-resource pools. For cases in which the UE 115-a receives the resource grant via SCI, multiple transmissions may be scheduled via a single SCI or each transmission may be scheduled via its own individual SCI. In this way, the UE 115-a may receive respective SCI corresponding to each respective transmission of the one or more transmissions that are scheduled.

In some cases, the bandwidth aggregation across sub-resource pools may be enabled, such that a network node may schedule a single PSSCH across the sub-resource pools (e.g., in a continuous or discontinuous allocation). If discontinuous repetition is enabled, different RVs or a same redundancy version (RV) may be used across sub-resource pool allocations. In this way, the one or more transmissions scheduled in the one or more sub-resource pools may include a sidelink channel (e.g., PSSCH) transmission that is scheduled across the sub-resource pools, where each of the sub-resource pools may be associated with an RV for the sidelink channel transmission.

In some wireless communications systems, the network entity 105-a may configure sidelink resource grants (e.g., dynamic grants, configured grants) based on DCI and a radio network temporary identifier (RNTI). For example, the network entity 105-a may configure a sidelink grant by scrambling a DCI (e.g., DCI 3_0) with a sidelink config-ured-scheduling RNTI, which may indicate a resource pool index. In cases of the resource pool being divided into multiple sub-resource pools as described herein, the network entity 105-a may update the DCI to indicate resource grants on a per-sub-resource pool basis. For example, in DCI, the network entity 105-a may assign different grants or config-ured grants per sub-resource pool. In addition, the network entity 105-a may indicate a respective time domain resource allocation (TDRA) or a respective frequency domain resource allocation (FDRA) for each sub-resource pool. In this way, the UE 115-a may receive, in DCI, a resource grant (e.g., a configured grant, a dynamic grant) that schedules one or more transmissions in one or more of the sub-resource pools, where the DCI may include for each of the scheduled one or more transmissions, a respective sub-resource pool indication that indicates one or more TDRAs or one or more FDRAs and at least one of the sub-resource pools for a respective transmission.

In some aspects, the network entity 105-a may activate one sub-resource pool or multiple sub-resource pools per UE 115 at a given time. The network entity 105-a may indicate the one or more activated sub-resource pools via DCI, which may include a resource pool index and sub-resource pool indices. That is, the UE 115-a may receive DCI configured to activate a respective one or more resources of each sub-resource pool such that a quantity of activated resources of each sub-resource pool is less than a threshold amount, where the DCI indicates a resource pool index that corre-sponds to the resource pool and one or more sub-resource pool indices that correspond to the activated resources of each sub-resource pool.

In some cases, the techniques described herein may allow for an offset between transmissions across configured grants. That is, if a configured grant is activated on a partitioned resource pool (e.g., the resource pool divided into multiple sub-resource pools) where multiple configured grant trans-missions have different TDRAs, the network entity 105-a may indicate an offset across the configured grants such that they are non-overlapping in time. The UE 115-a may receive control information (e.g., DCI) that schedules at least two different sets of configured grant transmissions across the multiple sub-resource pools, where the at least two different sets of configured grant occasions may be associated with different TDRAs to prevent time domain overlapping between individual ones of the different sets of configured grant transmissions. This may reduce or avoid power ampli-fier phase changes due to misaligned transmissions and improve communication reliability.

Full-capability UEs 115 may refrain from using a portion of a resource pool (e.g., sub-resource pools) allocated to low-power or low-bandwidth (e.g., RedCap) network nodes to avoid disturbing QoS, priority, performance, or transmis-sion parameters (e.g., power, precoding and beamforming, MCS, and the like) of the low-power or low-bandwidth devices. In addition, refraining from using the sub-resource pools may reduce interference created by the full-capability UEs 115. In this way, the UE 115-a may communicate with the UE 115-b in a first subset of the multiple sub-resource pools that are different from a second subset of the multiple resource pools being allocated for use by network nodes that have a lower power or lower bandwidth with respect to the UE 115-a.

The UE 115-a may communicate with the UE 115-b based on one or more sub-resource pools of the set of multiple sub-resource pools indicated in the control information 215. For example, the UE 115-a may use the one or more sub-resource pools to participate in sidelink communica-tions with the UE 115-b via the communications link 205-b.

Figure 3:
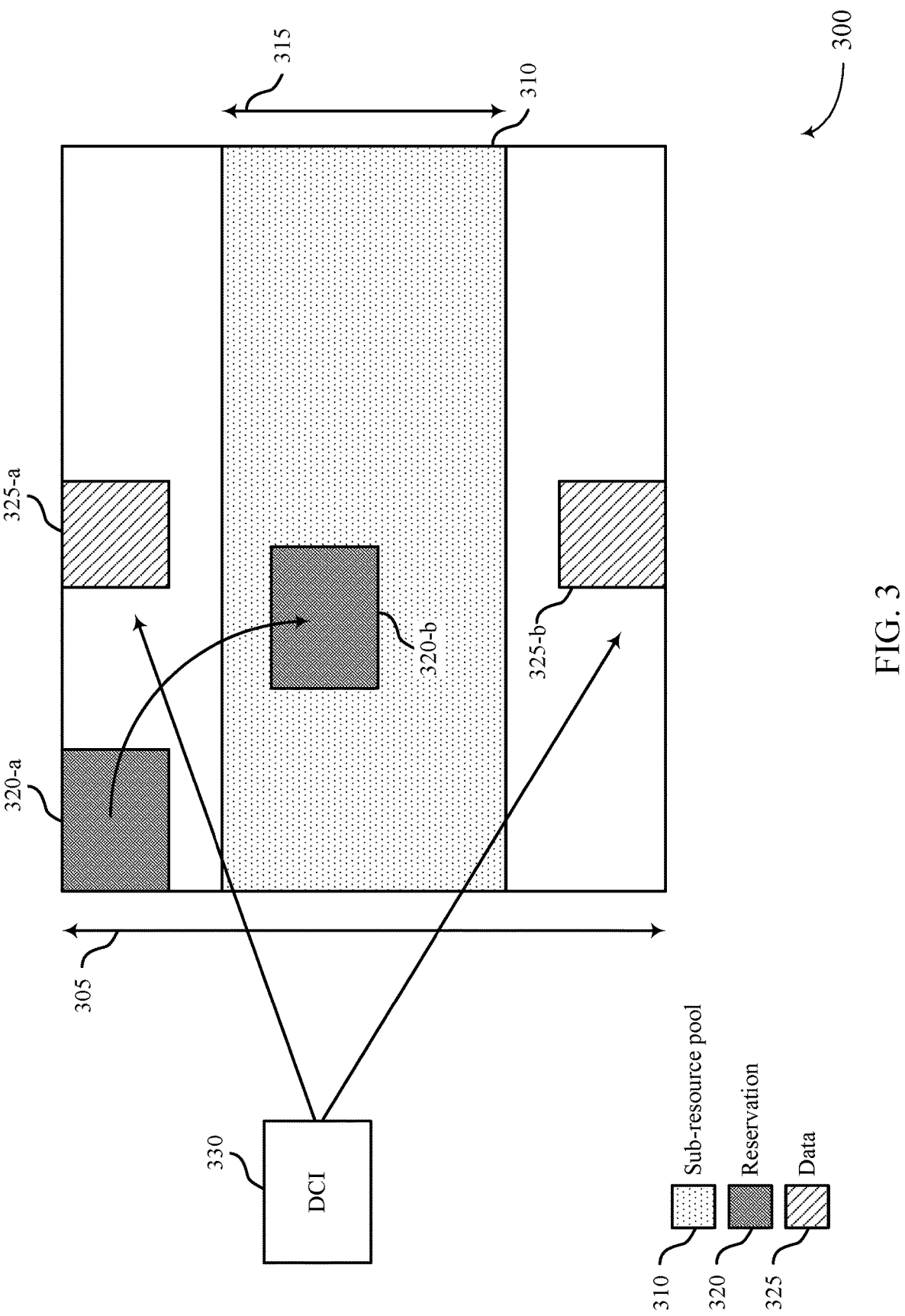
FIG. 3 illustrates an example of a resource pool that supports CSI reporting based on sub-resource pools for sidelink communications in accordance with one or more aspects of the present disclosure.

FIG. 3 illustrates an example of a resource pool 300 that supports CSI reporting based on sub-resource pools for sidelink communications in accordance with one or more aspects of the present disclosure. In some aspects, the resource pool 300 may implement aspects of the wireless communications systems 100 and 200 or may be imple-mented by aspects of the wireless communications systems 100 and 200. For example, the resource pool 300 may be divided into sub-resource pools which UEs 115 may use to communicate (e.g., sidelink communications).

The resource pool 300 may have a bandwidth 305, which may be used by full-capability (e.g., normal) sidelink UEs 115. Alternatively, the resource pool 300 may include a set of multiple sub-resource pools 310 each having a bandwidth 315, which may be used by RedCap sidelink UEs 115. In this way, some UEs 115 may communicate using the resource pool 300 and some other UEs 115 may communicate using one or multiple sub-resource pools 310. For example, a UE 115 may receive an indication (e.g., via DCI or SCI) of a reservation 320-*a* (e.g., a resource grant) for the resource pool 300, and a different UE 115 may see the reservation 320-*b* for the sub-resource pool 310, the reservation 320-*b* signaled outside the bandwidth 315 as the reservation 320-*a*.

In some aspects, the reservations 320 may be used to schedule transmissions of data 325 in the resource pool 300 or one or more sub-resource pools 310. The transmissions across the sub-resource pools 310 may be aligned such that phase coherency is maintained across the transmissions. For example, for sidelink communication between UEs 115, a ULE 115 may transmit data 325-*a* (e.g., a sidelink transmission) across at least one or more resources of multiple sub-resource pools 310. Alternatively, a network entity 105 may enable an offset between the transmissions to maintain the phase coherency, for example, using TDM. That is, the transmissions of the data 325-*a* and data 325-*b* across the sub-resource pool 310 (and the respective resources carrying the transmissions) may be aligned to facilitate coherent transmission of the sidelink communication or may be offset from each other (e.g., using TDM) to avoid overlapping in time.

Alternatively, the resource pool 300 may allow for repeated data 325 or repeated transport block transmissions across sub-resource pools 310 to improve signaling reliability. For example, a UE 115 may use each sub-resource pool 310 in the resource pool 300 to send some data 325 to enhance reliability if a DCI field includes an "all subresource pool" indication. In this way, a UE 115 may transmit one or more repetitions of the data 325 (e.g., the data 325-*a* and the data 325-*b*) or one or more repetitions of transport blocks via different sub-resource pools 310. In some aspects, the UE 115 may receive DCI 330 from a network entity 105 indicating that the data 325 are to be transmitted based on the one or more sub-resource pools 310.

Figure 4:
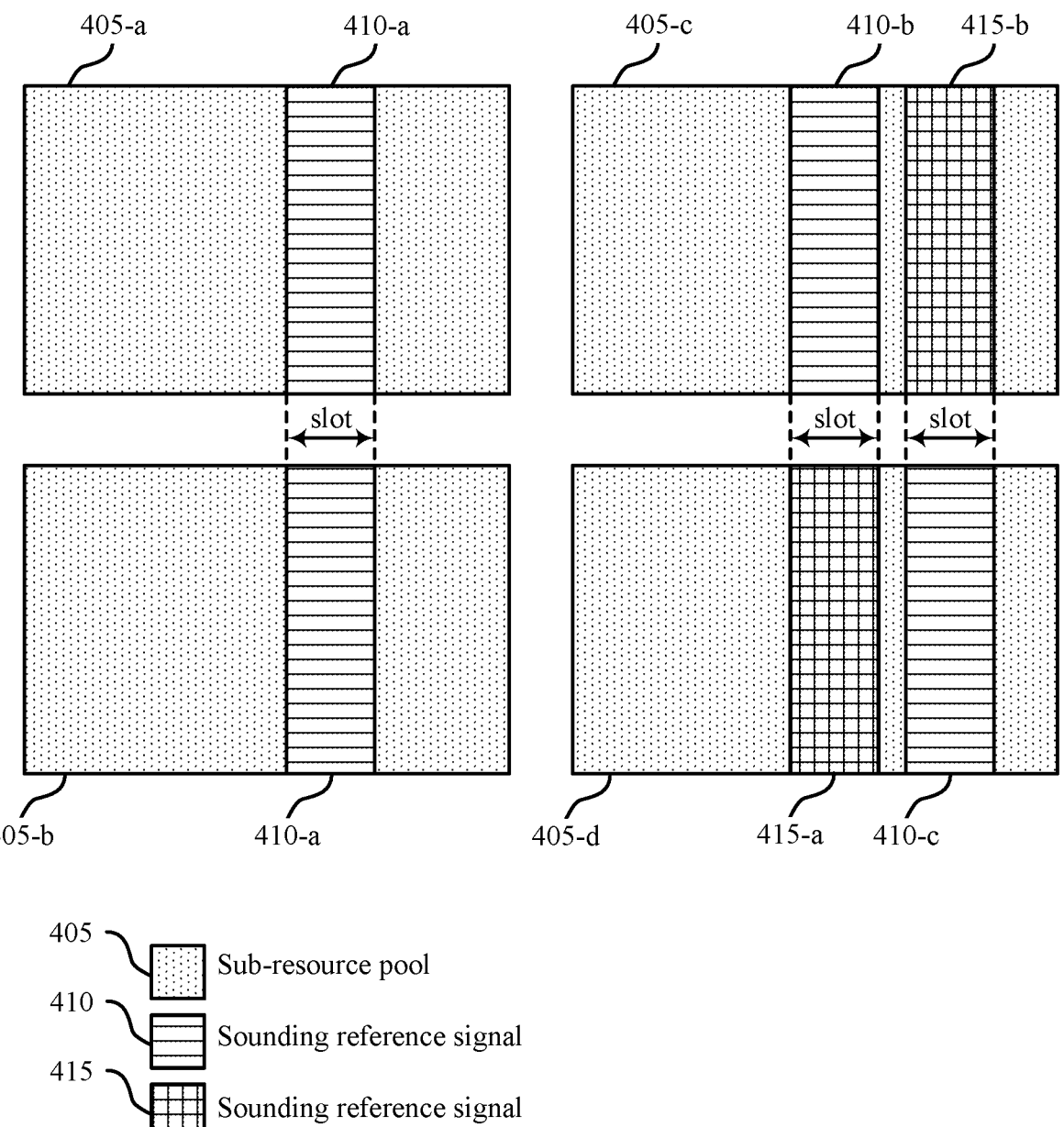
FIG. 4 illustrates an example of a sub-resource pool configuration that supports CSI reporting based on sub-resource pools for sidelink communications in accordance with one or more aspects of the present disclosure.

FIG. 4 illustrates an example of a sub-resource pool configuration 400 that supports CSI reporting based on sub-resource pools for sidelink communications in accordance with one or more aspects of the present disclosure. In some aspects, the sub-resource pool configuration 400 may implement aspects of the wireless communications systems 100 and 200 or may be implemented by aspects of the wireless communications systems 100 and 200. For example, the sub-resource pool configuration 400 may enable UEs 115 (e.g., low-power or low-bandwidth UEs) to communicate (e.g., sidelink communications) using one or more sub-resource pools 405 of a resource pool.

In a wireless communications system, UEs 115 (e.g., sidelink UEs) may transmit reference signals and perform CSI reporting based on one or more sub-resource pools 405 in which the UEs 115 are communicating. In some aspects, a UE 115 may transmit sidelink reference signals within a PSSCH allocation and CSI report within a MAC-CE. For example, the UE 115 may use a wideband sidelink reference signal that spans an entire resource pool, where dedicated resources with a particular periodicity may be used by all UEs 115 and are sent from a primary UE 115. A network entity 105 may configure such reference signal transmissions in RRC signaling (e.g., an information element sl-LatencyBound-CSI-Report which may be maintained for each PC5-RRC connection and may have a supported range of {3, . . . , 160} slots).

As described herein, where resources of a resource pool may divided among multiple sub-resource pools 405 to facilitate sidelink communication between low-power or low-bandwidth (e.g., RedCap) UEs 115. In some aspects of CSI reporting, a UE 115 may use one or multiple frequency hopping patterns to sound the sub-resource pools 405. For example, sidelink reference signals may be sub-resource-pool-based such that one or more sub-resource pools 405 may be sounded in a single slot or across multiple slots. That is, the UE 115 may transmit one or more sidelink reference signals in multiple sub-resource pools 405 based on one or more frequency hopping patterns, where the sub-resource pools 405 are sounded in a single slot or across multiple slots in accordance with the one or more frequency hopping patterns.

In some aspects, the UE 115 may receive first control information (e.g., the control information 210 described herein with reference to FIG. 1) indicating a resource pool and second control information (e.g., the control information 215 described herein with reference to FIG. 1) indicating the multiple sub-resource pools 405 of the resource pool. In addition, the second control information may indicate the one or more frequency hopping patterns to be used for sounding one or more of the sub-resource pools. In some aspects, the first control information may indicate multiple frequency hopping patterns that are each configured to sound multiple respective sub-resource pools 405. For example, one frequency hopping pattern may be used across all sub-resource pools 405, including a sub-resource pool 405-*a*, a sub-resource pool 405-*b*, a sub-resource pool 405-*c*, and a sub-resource pool 405-*d*.

Alternatively, different frequency hopping patterns may be used for different sub-resource pools. That is, each frequency hopping pattern indicated in the second control information may be associated with a single respective individual sub-resource pool 405. In some aspects, the network entity 105-*a* may configure the frequency hopping patterns as part of a resource pool configuration (e.g., via the first control information) or a sub-resource pool configuration (e.g., via the second control information). Two or more UEs 115 may select a particular frequency hopping pattern to use via RRC signaling or a MAC-CE based on a source identifier, a destination identifier, or any other identifiers agreed upon by (or indicated to) the UEs 115 (e.g., scrambling identifiers). That is, a given frequency hopping pattern may be a function of a source identifier, a destination or group common identifier, or another identifier indicated by the network entity 105, a controlling unit, or between UEs 115.

In some cases, each sub-resource pool 405 may include some dedicated resources to reserve for sounding. For example, to sound a sub-resource pool 405, a primary UE 115 may transmit an indication to of the frequency hopping pattern to use for the sounding on one or more dedicated resources of the sub-resource pool 405. Alternatively, a UE 115 that may reserve a resource pool may also sound each of the sub-resource pools 405 of the resource pool using one or more frequency hopping patterns.

In the example of FIG. 4, the second control information may indicate the sub-resource pool 405-*a*, the sub-resource pool 405-*b*, the sub-resource pool 405-*c*, and the sub-resource pool 405-*d*, which may each include one or more respective resources of a resource pool. In cases in which one frequency hopping pattern is used to sound each subresource pool 405, the sub-resource pool 405-*a* and the sub-resource pool 405-*b* may both be sounded in a same slot, the sub-resource pool 405-*a* using a sounding reference signal 410-*a* and the sub-resource pool 405-*b* using the sounding reference signal 410-*c*. That is, the frequency hopping pattern may indicate that the sub-resource pool 405-*a* and the sub-resource pool 405-*b* are to be sounded in a same slot using a same sounding reference signal 410 at a same time.

The network entity 105 may configure periodic sidelink reference signals per sub-resource pool 405, and the sidelink reference signals may have a same or different configurations including parameters such as periodicity, a quantity of ports, and a power offset relative to a control or data channel, among other parameters. In such cases, the UE 115 may receive third control information that includes a set of parameters for a sidelink reference signal transmission on a per-sub-resource pool basis.

Additionally, or alternatively, the network entity 105-*a* may define a frequency gap between sub-resource pools 405 to reduce interference to the low-power or low-bandwidth UEs 115 communicating using the sub-resource pools 405. For example, instead of enabling sounding of the sub-resource pool 405-*c* and the sub-resource pool 405-*d* in a same slot and using a same sounding reference signal 410, the network entity 105 may configure a frequency gap such that the sub-resource pool 405-*d* is sounded in a later slot than the sub-resource pool 405-*c*, the slots separated by the frequency gap. The frequency gap may be based on a capability of the UEs 115 using the sub-resource pools 405 or of a victim UE 115 (e.g., a UE 115 experiencing interference), and may have a periodicity (e.g., 4 slots, 8 slots). In some aspects, the second control information from the network entity 105 may indicate the frequency gap between the sub-resource pools 405 based on a capability of a UE 115.

In some cases, the UE 115 may receive a reservation request that may indicate a frequency hopping pattern such that primary UEs 115 may determine each others' frequency hopping patterns, which may allow for multiplexing transmissions from the UEs 115. In some aspects, the UE 115 may communicate a reservation request that indicates one or more frequency hopping patterns to be applied for sidelink reference signals transmitted or received in the sub-resource pools 405. For example, two UEs 115 may be enabled to communicate using the sub-resource pool 405-*c* and the sub-resource pool 405-*d*. A first UE 115 may use a first frequency hopping pattern that indicates to sound the sub-resource pool 405-*c* using a sounding reference signal 410-*b* in a first slot and the sub-resource pool 405-*d* using a sounding reference signal 415-*a* in a second slot subsequent to the first slot. A second UE 115 may determine that the first UE 115 is using the first frequency hopping pattern and as such, may use a second frequency hopping pattern that avoids collisions or other interference with the operations of the first UE 115. For example, the second frequency hopping pattern may indicate to first sound the sub-resource pool 405-*d* using a sounding reference signal 415-*b* in the first slot and the sub-resource pool 405-*d* using a sounding reference signal 410-*c* in the second slot subsequent to the first slot. As such, the UEs 115 may sound different sub-resource pools 405 in a given slot at a given time using the sounding reference signals 410 and the sounding reference signals 415.

Sub-resource pool partitioning may enable for the multiplexing of several primary UEs 115 together even if the UEs 115 select a same resource but use different frequency hopping patterns. The UE 115 may multiplex transmission of one or more sidelink reference signals with additional sidelink reference signals reserved for transmission over the sub-resource pools 405, where the one or more sidelink reference signals are multiplexed with the additional sidelink reference signals via application of one or more frequency hopping patterns that pertain to the sub-resource pools 405.

Figure 5:
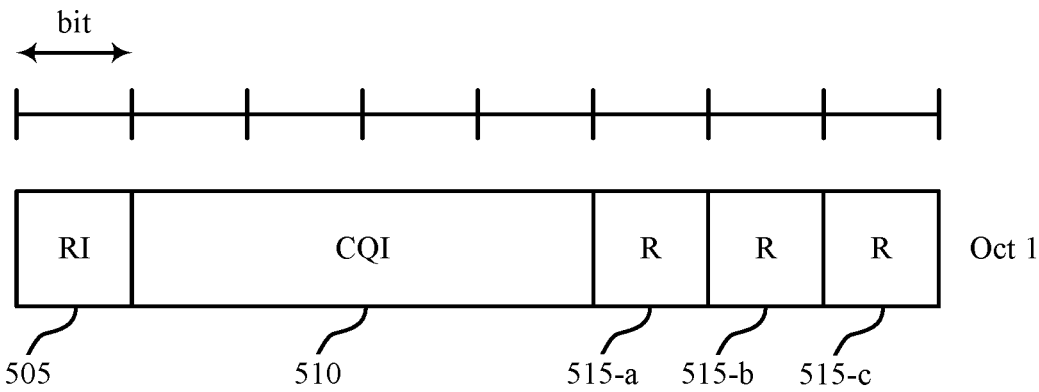
FIGS. 5 and 6 illustrate examples of medium access control (MAC) control elements (MAC-CEs) that support CSI reporting based on sub-resource pools for sidelink communications in accordance with one or more aspects of the present disclosure.
Figure 5:
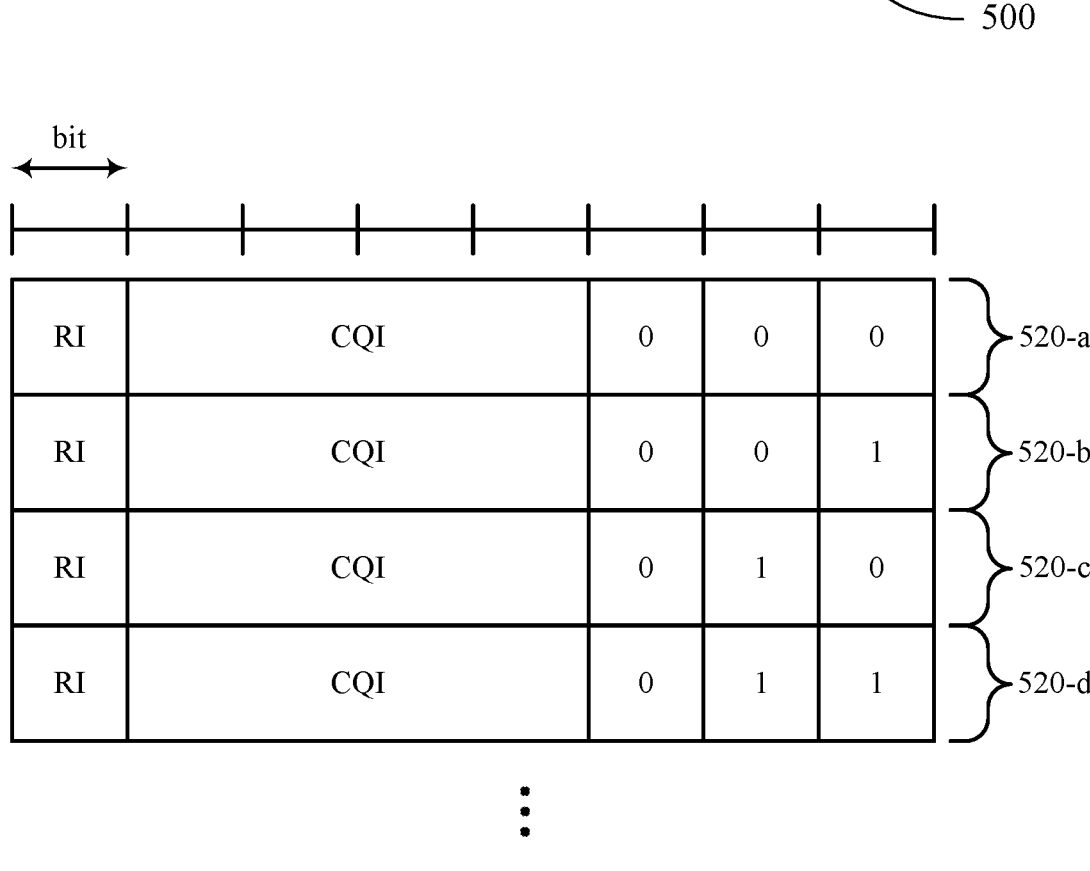

FIG. 5 illustrates an example of a MAC-CE 500 and a MAC-CE 501 that support CSI reporting based on sub-resource pools for sidelink communications in accordance with one or more aspects of the present disclosure. In some aspects, the MAC-CE 500 and the MAC-CE 501 may implement aspects of the wireless communications systems 100 and 200 or may be implemented by aspects of the wireless communications systems 100 and 200. For example, a UE 115 may use the MAC-CE 500 or the MAC-CE 501 to transmit a sidelink CSI report, where the MAC-CE 500 and the MAC-CE 501 may be configured based on one or more sub-resource pools of a resource pool.

In some cases, a network entity 105 may indicate (e.g., via RRC signaling) a reporting configuration for a UE 115 (e.g., a sidelink UE) transmitting a CSI report. For example, the network entity 105 may configure an information element sl-LatencyBound-CSI-Report differently per sub-resource pool and based on a quantity of subchannels per sub-resource pool. The network entity 105 may indicate such a configuration during an RRC connection with a UE 115 or dynamically, for example using L1, L2, or L3 signaling. Alternatively, the network entity 105 may indicate a single sl-LatencyBound-CSI-Report for a resource pool (e.g., a partitioned resource pool) and then transmit a delta RRC configuration for each sub-resource pool of the resource pool. In this way, the UE 115 may receive control information (e.g., RRC signaling, L1, L2, or L3 signaling) that includes a set of parameters that pertain to one or more CSI reports to be transmitted, values of the set of parameters being based on a quantity of sub-channels in corresponding ones of the multiple sub-resource pools.

The UE 115 may transmit a CSI report via the MAC-CE 500, which may include 8 bits per octet (e.g., October 1). The MAC-CE 500 may include one bit indicating an RI 505, four bits indicating a CQI 510, and three reserved bits 515 (e.g., R), including a reserved bit 515-*a*, a reserved bit 515-*b*, and a reserved bit 515-*c*. Using the MAC-CE 500, the UE 115 may report CSI for one sub-resource pool at a time, using the reserved bits 515 to indicated for which sub-resource pool the CSI is being reported. In this way, a maximum quantity of sub-resource pools of a resource pool may be eight, given that the MAC-CE 500 includes three reserved bits 515. In this way, the UE 115 may transmit a MAC-CE 500 that indicates CSI for a corresponding sub-resource pool of a set of multiple sub-resource pools, the MAC-CE 500 including a codepoint which indicates that the CSI pertains to a specific sub-resource pool.

The codepoint may be included within reserved bit fields (e.g., the reserved bits 515) of the MAC-CE 500. That is, the reserved bits 515 may be used temporarily to indicate the sub-resource pool associated with the reported CSI. The UE 115 may define the codepoint (e.g., 000, 001, 010, 011, 100, 101, 110, 111) to indicate CSI of the resource pool, which may include an average of the CSI across all sub-resource pools used in the report. For example, the UE 115 may use the first octet (e.g., October 1) of the MAC-CE 500 to report CSI for a first sub-resource pool of the resource pool. The UE 115 may indicate the first sub-resource pool in the reserved bits 515, where the reserved bit 515-*a* may have a value of 0, the reserved bit 515-*b* may have a value of 0, and the reserved bit 515-*c* may have a value of 1, such that the bit combination 001 indicates the first sub-resource pool.

In some aspects, the UE 115 may use multiple entries (e.g., octets) in the MAC-CE 500 to indicate a sub-resource pool and its corresponding RI 505 and a CQI 510. For example, for two sub-resource pools, the UE 115 may include two corresponding RIs 505, two corresponding CQI 510, and two corresponding sets of reserved bits 515 to indicate respective CSI as described herein. That is, the ULE 115 may transmit, via the MAC-CE 500, multiple sets of CSI for corresponding sub-resource pools, each of the CSI including a respective RI 505, respective CQI 510, or both.

Additionally, the UE 115 may use the MAC-CE 501 to transmit multiple CSI reports concurrently, where a quantity of CSI reports (e.g., X) may be based on a capability of the UE 115. The UE 115 may indicate its capability (e.g., full-capability or RedCap, which may include lower-power and lower-bandwidth) using L1, L2, or L3 signaling. In addition, the quantity of CSI reports may be a function of sizes of each sub-resource pool (e.g., quantities of subchannels or resources). The UE 115 may leverage three reserved bits in each octet of the MAC-CE 501 to transmit the multiple reports. As such, the UE 115 may transmit a maximum of 8 CSI reports (e.g., X=8) for 8 corresponding sub-resource pools of a resource pool, where the three reserved bits map to a given sub-resource pool.

In a non-limiting example, the MAC-CE 501 may include four CSI reports 520 (e.g., four octets), each corresponding to a sub-resource pool. Each CSI report 520 may include an RI and a CQI corresponding to that sub-resource pool. In addition, each CSI report 520 may include three reserved bits, where values of the reserved bits may indicate which sub-resource pool that CSI corresponds to. For example, a CSI report 520-*a* may include three reserved bits with a value 000, which may indicate a first sub-resource pool. Additionally, a CSI report 520-*b* may include three reserved bits with a value 001 indicating a second sub-resource pool, a CSI report 520-*c* may include three reserved bits with a value 010 indicating a third sub-resource pool, and a CSI report 520-*d* may include three reserved bits with a value 011 indicating a fourth sub-resource pool. The MAC-CE 501 may include up to eight CSI reports 520.

Figure 6:
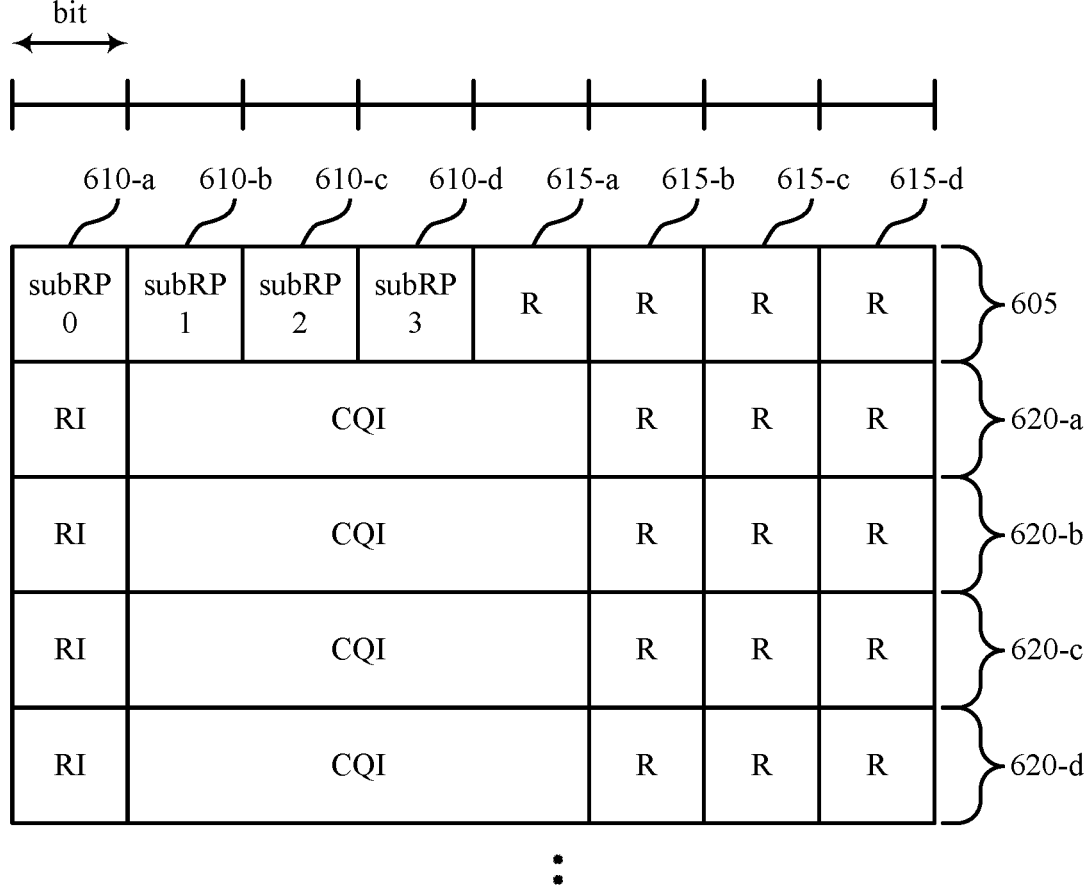

FIG. 6 illustrates an example of a MAC-CE 600 that supports CSI reporting based on sub-resource pools for sidelink communications in accordance with one or more aspects of the present disclosure. In some aspects, the MAC-CE 600 may implement aspects of the wireless communications systems 100 and 200 or may be implemented by aspects of the wireless communications systems 100 and 200. For example, a UE 115 may use the MAC-CE 600 to transmit a sidelink CSI report, where the MAC-CE 600 may be configured based on one or more sub-resource pools of a resource pool.

As described herein with reference to FIG. 5, a UE 115 may transmit a CSI report indicating CSI and an RI, a CQI, or both for a sub-resource pool. In some aspects, the UE 115 may transmit the CSI report via a MAC-CE, such as the MAC-CE 600. The UE 115 may transmit multiple CSI reports concurrently, where a quantity (e.g., X) of CSI reports the UE 115 may concurrently transmit may be based on a capability of the UE 115 and a quantity of sub-channels or resources in each of the sub-resource pools for which CSI is being reported. The UE 115 may leverage three reserved bits in each octet of the MAC-CE 600 to transmit the multiple reports. As such, the UE 115 may transmit a maximum of 8 CSI reports (e.g., X=8) for 8 corresponding sub-resource pools of a resource pool, where the three reserved bits map to a given sub-resource pool.

In some aspects, the UE 115 may transmit a maximum of 8 CSI reports (e.g., CSI reports for 8 sub-resource pools) via the MAC-CE 600 after adding one byte as a header 605 to the MAC-CE 600 to indicate for which sub-resource pools CSI is being reported. The header 605 may include one or more bits 610 indicating whether the MAC-CE 600 includes CSI of a particular sub-resource pool. For each bit 610, "subRP x" may represent a binary value that indicates whether the MAC-CE 600 includes the CSI of that sub-resource pool (subRP) x. For example, a bit 610-*a* indicates a subRP 0, a bit 610-*b* indicates a subRP 1, a bit 610-*c* indicates a subRP 2, and a bit 610-*d* indicates a subRP 3. Based on the bits 610 in the header 605, the MAC-CE 600 may include CSI for the subRP 0, the subRP 1, the subRP 2, and the subRP 3. As described herein, the resource pool may include up to 8 sub-resource pools. If the resource pool includes fewer than 8 sub-resource pools, as in the example of FIG. 6, the remaining bits of the header 605 may be reserved bits 615. As such, as the MAC-CE 600 includes CSI for 4 sub-resource pools, the header may include four reserved bits 615 (e.g., a reserved bit 615-*a*, a reserved bit 615-*b*, a reserved bit 615-*c*, and a reserved bit 615-*d*).

As described herein with reference to FIG. 5, the MAC-CE 600 may include 4 CSI reports 620 (e.g., in 4 octets), each CSI report 620 corresponding to one of the sub-resource pools indicated in the bits 610 of the header 605. For example, the MAC-CE 600 may include a CSI report 620-*a* corresponding to the subRP 0, a CSI report 620-*b* corresponding to the subRP 1, a CSI report 620-*c* corresponding to the subRP 2, and a CSI report 620-*d* corresponding to the subRP 3. Each CSI report 620 may include one bit for reporting an RI, four bits for reporting a CQI, or both, and some quantity of reserved bits, R (e.g., 3 reserved bits).

Figure 7:
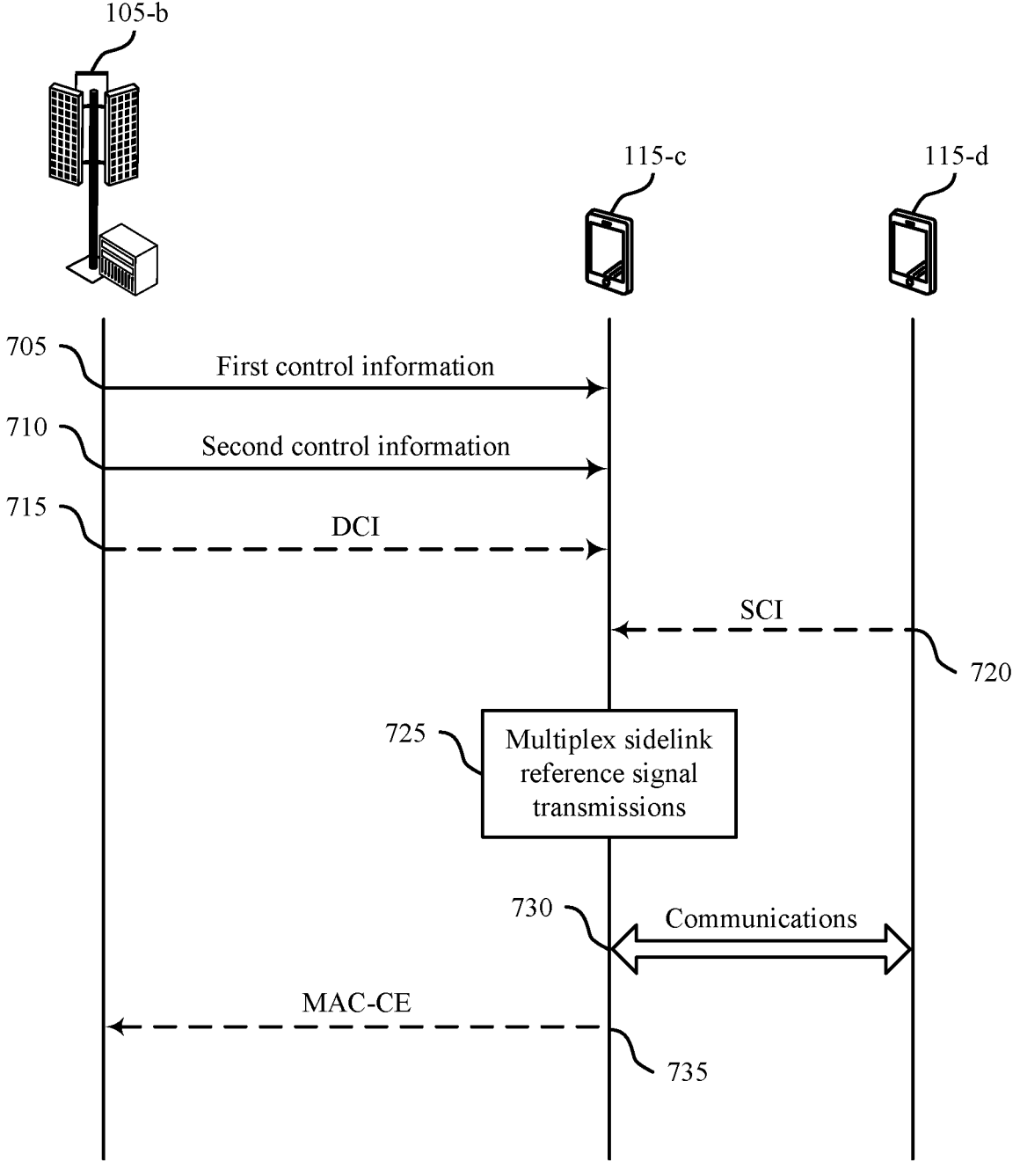
FIG. 7 illustrates an example of a process flow that supports CSI reporting based on sub-resource pools for sidelink communications in accordance with one or more aspects of the present disclosure.

FIG. 7 illustrates an example of a process flow 700 that supports CSI reporting based on sub-resource pools for sidelink communications in accordance with one or more aspects of the present disclosure. The process flow 700 may implement aspects of wireless communications systems 100 and 200, or may be implemented by aspects of the wireless communications systems 100 and 200. For example, the process flow 700 may illustrate operations between a UE 115-*c*, a UE 115-*d*, and a network entity 105-*b*, which may be examples of corresponding devices described herein. In the following description of the process flow 700, the operations between the UE 115-*c*, the UE 115-*d*, and the network entity 105-*b* may be transmitted in a different order than the example order shown, or the operations performed by the UE 115-*c*, the UE 115-*d*, and the network entity 105-*b* may be performed in different orders or at different times. Some operations may also be omitted from the process flow 700, and other operations may be added to the process flow 700.

At 705, the UE 115-*c* (e.g., a first network node) may receive, from the network entity 105-*b*, first control information that indicates a resource pool for sidelink communication between the UE 115-*c* and the UE 115-*d* (e.g., a second network node), where the resource pool includes a set of multiple resources. In some cases, the first control information may include RRC signaling.

At 710, the UE 115-*c* may receive, from the network entity 105-*b*, second control information that indicates a set of multiple sub-resource pools for the sidelink communication between the UE 115-*c* and the UE 115-*d*. Each sub-resource pool of the set of multiple sub-resource pools may include a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools. In addition, each respective sub-resource pool may correspond to at least one or a respective set of channel types, a respective set of channel conditions, or a respective set of operational parameters. That is, multiple sub-resource pools of a resource pool may be non-overlapping with each other, and resources within each sub-resource pool may be non-overlapping.

At 715 and 720, the UE 115-c may receive, in DCI or SCI, respectively, a resource grant that schedules one or more transmissions in one or more sub-resource pools of the set of multiple sub-resource pools, where the resource pool may be a dynamic grant or a configured grant. In some aspects, the DCI may activate, deactivate, or reactivate one or more of the sub-resource pools, such that the UE 115-c may use particular sub-resource pools for sidelink communication with the UE 115-d.

At 725, the UE 115-c may multiplex transmission of one or more sidelink reference signals with additional sidelink reference signals reserved for transmission over the set of multiple sub-resource pools, where the one or more sidelink reference signals are multiplexed with the additional sidelink reference signals via application of one or more frequency hopping patterns that pertain to the set of multiple sub-resource pools. In some aspects, the second control information may indicate the one or more frequency hopping patterns which the UE 115-c may use to sound one or more of the sub-resource pools. The multiplexing may be enabled if the UE 115-c and the UE 115-d may determine each others' frequency hopping patterns.

At 730, the UE 115-c may communicate with the UE 115-d based on one or more sub-resource pools of the set of multiple sub-resource pools. For example, the UE 115-c and the UE 115-d may participate sidelink communication.

At 735, the UE 115-c may transmit, to the network entity 105-b, a MAC-CE that indicates CSI for a corresponding one or the set of multiple sub-resource pools, the MAC-CE including a codepoint which indicates that the CSI pertains to a specific sub-resource pool of the set of multiple sub-resource pools. In some aspects, the codepoint may be included within reserved bit fields of the MAC-CE. Additionally, the MAC-CE may include an RI, a CQI, or both corresponding to CSI for a sub-resource pool.

Figure 8:
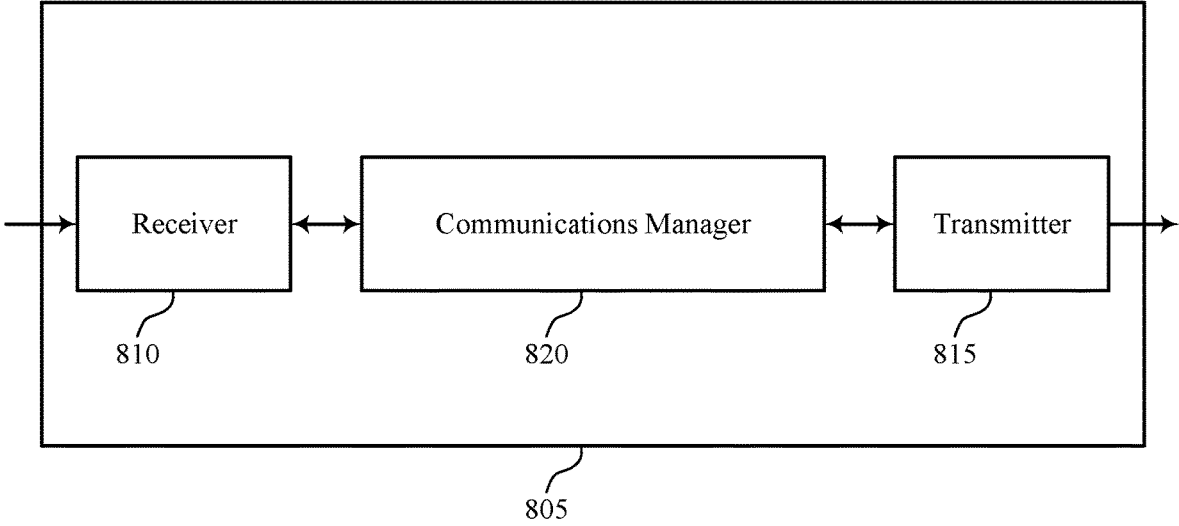
FIGS. 8 and 9 illustrate block diagrams of devices that support CSI reporting based on sub-resource pools for sidelink communications in accordance with one or more aspects of the present disclosure.

FIG. 8 illustrates a block diagram 800 of a device 805 that supports CSI reporting based on sub-resource pools for sidelink communications in accordance with one or more aspects of the present disclosure. The device 805 may be an example of aspects of a network node as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to CSI reporting based on sub-resource pools for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to CSI reporting based on sub-resource pools for sidelink communications). In some aspects, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of CSI reporting based on sub-resource pools for sidelink communications as described herein. For example, the communications manager 820, the receiver 810, the transmitter 815, or various combinations or components thereof may support a method for performing one or more of the functions described herein.

In some aspects, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first network node in accordance with examples as disclosed herein. For example, the communications manager 820 may be configured as or otherwise support a means for receiving first control information that indicates a resource pool for sidelink communication between the method and a second network node, where the resource pool includes a set of multiple resources. The communications manager 820 may be configured as or otherwise support a means for receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The communications manager 820 may be configured as or otherwise support a means for communicating with the second network node based on one or more sub-resource pools of the set of multiple sub-resource pools.

Additionally, or alternatively, the communications manager 820 may support wireless communication in accordance with examples as disclosed herein. For example, the communications manager 820 may be configured as or otherwise support a means for transmitting first control information that indicates a resource pool for sidelink communication between a second network node and a third network node, where the resource pool includes a set of multiple resources. The communications manager 820 may be configured as or otherwise support a means for transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for CSI reporting based on sub-resource pools for sidelink communications, which may reduce interference, improve communication reliability, and improve resource utilization.

Figure 9:
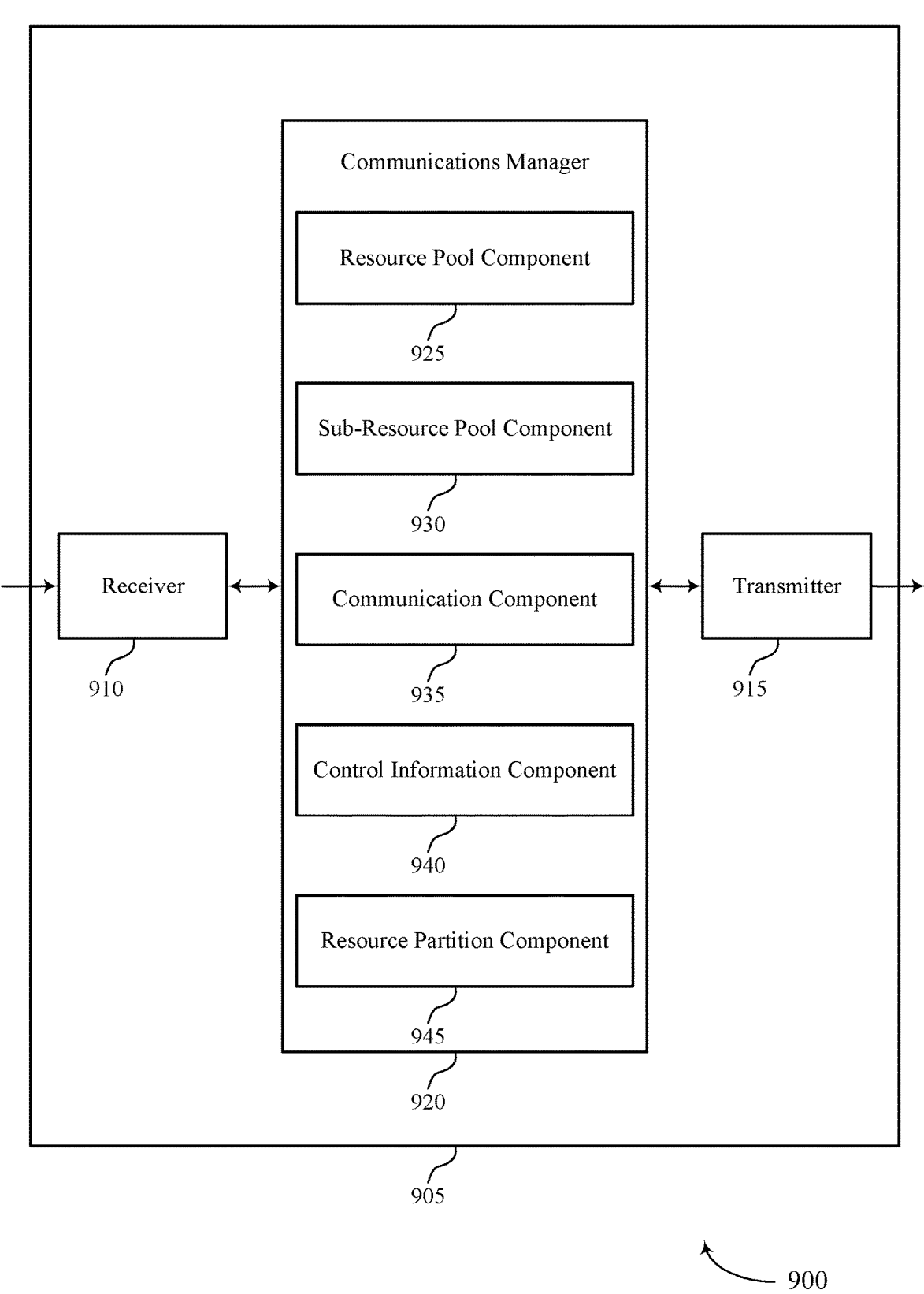

FIG. 9 illustrates a block diagram 900 of a device 905 that supports CSI reporting based on sub-resource pools for sidelink communications in accordance with one or more aspects of the present disclosure. The device 905 may be an example of aspects of a device 805 or a network node 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to CSI reporting based on sub-resource pools for sidelink communications). Information may be passed on to other components of the device 905. The receiver 910 may utilize a single antenna or a set of multiple antennas.

The transmitter 915 may provide a means for transmitting signals generated by other components of the device 905.

For example, the transmitter 915 may transmit information such as packets, user data, control information, or any combination thereof associated with various information channels (e.g., control channels, data channels, information channels related to CSI reporting based on sub-resource pools for sidelink communications). In some aspects, the transmitter 915 may be co-located with a receiver 910 in a transceiver module. The transmitter 915 may utilize a single antenna or a set of multiple antennas.

The device 905, or various components thereof, may be an example of means for performing various aspects of CSI reporting based on sub-resource pools for sidelink communications as described herein. For example, the communications manager 920 may include a resource pool component 925, a sub-resource pool component 930, a communication component 935, a control information component 940, a resource partition component 945, or any combination thereof. The communications manager 920 may be an example of aspects of a communications manager 820 as described herein. In some aspects, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network node in accordance with examples as disclosed herein. The resource pool component 925 may be configured as or otherwise support a means for receiving first control information that indicates a resource pool for sidelink communication between the method and a second network node, where the resource pool includes a set of multiple resources. The sub-resource pool component 930 may be configured as or otherwise support a means for receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The communication component 935 may be configured as or otherwise support a means for communicating with the second network node based on one or more sub-resource pools of the set of multiple sub-resource pools.

Additionally, or alternatively, the communications manager 920 may support wireless communication in accordance with examples as disclosed herein. The control information component 940 may be configured as or otherwise support a means for transmitting first control information that indicates a resource pool for sidelink communication between a second network node and a third network node, where the resource pool includes a set of multiple resources. The resource partition component 945 may be configured as or otherwise support a means for transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

Figure 10:
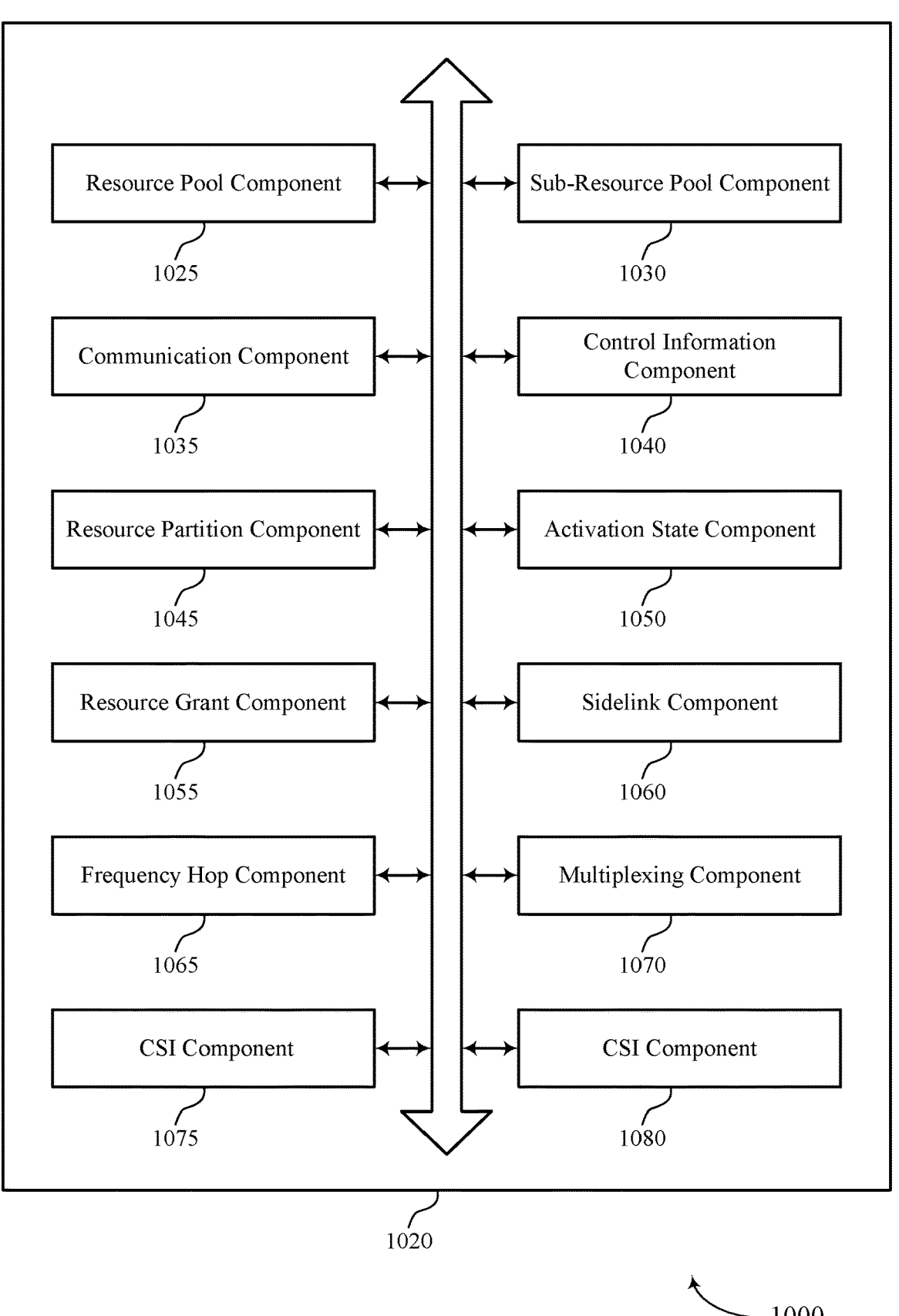
FIG. 10 illustrates a block diagram of a communications manager that supports CSI reporting based on sub-resource pools for sidelink communications in accordance with one or more aspects of the present disclosure.

FIG. 10 illustrates a block diagram 1000 of a communications manager 1020 that supports CSI reporting based on sub-resource pools for sidelink communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of CSI reporting based on sub-resource pools for sidelink communications as described herein. For example, the communications manager 1020 may include a resource pool component 1025, a sub-resource pool component 1030, a communication component 1035, a control information component 1040, a resource partition component 1045, an activation state component 1050, a resource grant component 1055, a sidelink component 1060, a frequency hop component 1065, a multiplexing component 1070, a CSI component 1075, a CSI component 1080, or any combination thereof. Each of these components may communicate, directly or indirectly, with one another (e.g., via one or more buses).

The communications manager 1020 may support wireless communication at a first network node in accordance with examples as disclosed herein. The resource pool component 1025 may be configured as or otherwise support a means for receiving first control information that indicates a resource pool for sidelink communication between the method and a second network node, where the resource pool includes a set of multiple resources. The sub-resource pool component 1030 may be configured as or otherwise support a means for receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The communication component 1035 may be configured as or otherwise support a means for communicating with the second network node based on one or more sub-resource pools of the set of multiple sub-resource pools.

In some aspects, the second control information indicates one or more differences between the set of multiple sub-resource pools and the resource pool. In some aspects, the second control information indicates a respective size of each sub-resource pool of the set of multiple sub-resource pools, where the respective size of each sub-resource pool is based on a capability of the method.

In some aspects, the activation state component 1050 may be configured as or otherwise support a means for transmitting, in a common resource pool that is common to a set of multiple network nodes that includes the first network node and the second network node, information that indicates a change in a respective activation state of at least a respective one or more resources of each sub-resource pool.

In some aspects, the common resource pool is a primary resource pool associated with a primary component carrier, a primary sub-resource pool within the primary resource pool associated with the primary component carrier, or a secondary resource pool associated with a secondary component carrier.

In some aspects, the activation state component 1050 may be configured as or otherwise support a means for applying the change in the respective activation state based on respective ACK information from one or more network nodes of the set of multiple network nodes different from the first network node and the second network node.

In some aspects, the information that indicates the change in the respective activation state is indicative of a respective change in an activation state on a per-sub-resource pool basis.

In some aspects, the resource grant component 1055 may be configured as or otherwise support a means for receiving, in DCI or SCI, a resource grant that schedules one or more transmissions in one or more sub-resource pools of the set of multiple sub-resource pools, where the resource grant is a dynamic grant or a configured grant.

In some aspects, to support receiving the resource grant in the DCI or the SCI, the resource grant component 1055 may be configured as or otherwise support a means for receiving respective SCI corresponding to each respective transmission of the one or more transmissions that are scheduled.

In some aspects, the one or more transmissions scheduled in the one or more sub-resource pools include a sidelink channel transmission that is scheduled across the one or more sub-resource pools, and where each of the one or more sub-resource pools is associated with a respective RV for the sidelink channel transmission.

In some aspects, the resource grant component 1055 may be configured as or otherwise support a means for transmitting, in SCI, a resource grant that schedules one or more transmissions in one or more sub-resource pools of the set of multiple sub-resource pools, where the resource grant is a dynamic grant or a configured grant.

In some aspects, the activation state component 1050 may be configured as or otherwise support a means for receiving information that indicates a change in an activation state of at least a respective one or more resources of each sub-resource pool of the set of multiple sub-resource pools.

In some aspects, the resource grant component 1055 may be configured as or otherwise support a means for receiving, in DCI, a resource grant that schedules one or more transmissions in the one or more sub-resource pools, where the DCI includes, for each of the scheduled one or more transmissions, a respective sub-resource pool indication that indicates one or more TDRAs or one or more FDRAs and at least one of the set of multiple sub-resource pools for a respective transmission.

In some aspects, the activation state component 1050 may be configured as or otherwise support a means for receiving DCI configured to activate a respective one or more resources of each sub-resource pool of the set of multiple sub-resource pools such that a quantity of activated resources of each sub-resource pool is less than a threshold amount, where the DCI indicates a resource pool index that corresponds to the resource pool and one or more sub-resource pool indices that correspond to the activated resources of each sub-resource pool.

In some aspects, to support communicating with the second network node, the sidelink component 1060 may be configured as or otherwise support a means for transmitting a sidelink transmission across at least one or more resources of the set of multiple sub-resource pools, where the at least one or more resources of the set of multiple sub-resource pools are aligned to facilitate coherent transmission of the sidelink communication or are offset from each other to avoid overlapping in time.

In some aspects, to support communicating with the second network node, the sidelink component 1060 may be configured as or otherwise support a means for receiving a sidelink transmission across at least one or more resources of the set of multiple sub-resource pools, where the at least one or more resources of the set of multiple sub-resource pools are aligned to facilitate coherent transmission of the sidelink communication or are offset from each other to avoid overlapping in time.

In some aspects, to support communicating with the second network node, the communication component 1035 may be configured as or otherwise support a means for transmitting one or more repetitions of data or one or more repetitions of transport blocks via different ones of the set of multiple sub-resource pools.

In some aspects, the resource grant component 1055 may be configured as or otherwise support a means for receiving control information that schedules at least two different sets of configured grant transmissions across the set of multiple sub-resource pools, where the at least two different sets of configured grant transmissions are associated with different TDRAs to prevent time domain overlapping between individual ones of the different sets of configured grant transmissions.

In some aspects, to support communicating with the second network node, the communication component 1035 may be configured as or otherwise support a means for communicating with the second network node in a first subset of the set of multiple sub-resource pools that are different from a second subset of the set of multiple sub-resource pools, the second subset of the set of multiple sub-resource pools being allocated for use by network nodes that have a lower power or a lower bandwidth with respect to the method.

In some aspects, the respective set of channel types includes a physical sidelink shared channel, a physical sidelink control channel, or a physical sidelink feedback channel, and where the respective set of channel conditions includes a quantity of subchannels, a subchannel size, or a starting resource block, and where the respective set of operational parameters includes parameters pertaining to a code block rate, an MCS, a sensing configuration, or power control.

In some aspects, to support communicating with the second network node, the frequency hop component 1065 may be configured as or otherwise support a means for transmitting one or more sidelink reference signals in the set of multiple sub-resource pools based on one or more frequency hop patterns, where the set of multiple sub-resource pools are sounded in a single slot or across a set of multiple slots in accordance with the one or more frequency hop patterns.

In some aspects, the second control information indicates the one or more frequency hop patterns, where each frequency hop pattern of the one or more frequency hop patterns is configured to sound multiple respective sub-resource pools of the set of multiple sub-resource pools.

In some aspects, the second control information indicates the one or more frequency hop patterns, where each frequency hop pattern of the one or more frequency hop patterns is associated with a single respective individual sub-resource pool of the set of multiple sub-resource pools.

In some aspects, the frequency hop component 1065 may be configured as or otherwise support a means for receiving third control information that includes a set of parameters for sidelink reference signal transmission on a per-sub-resource pool basis, where the set of parameters indicates a periodicity, a quantity of ports, a power offset relative to a channel, or any combination thereof. In some aspects, the second control information indicates a frequency gap between the set of multiple sub-resource pools based on a capability of the method.

In some aspects, the frequency hop component 1065 may be configured as or otherwise support a means for communicating a reservation request that indicates one or more frequency hop patterns to be applied to sidelink reference signals transmitted or received in the set of multiple sub-resource pools.

In some aspects, the multiplexing component 1070 may be configured as or otherwise support a means for multiplexing transmission of one or more sidelink reference signals with additional sidelink reference signals reserved for transmission over the set of multiple sub-resource pools, where the one or more sidelink reference signals are multiplexed with the additional sidelink reference signals via application of one or more frequency hop patterns that pertain to the set of multiple sub-resource pools.

In some aspects, a frequency hop pattern of the one or more frequency hop patterns is associated with a source identifier, a destination identifier, a group common identifier, or an identifier indicated to the method.

In some aspects, the CSI component 1075 may be configured as or otherwise support a means for receiving third control information that includes a set of parameters that pertain to one or more CSI reports to be transmitted, values of the set of parameters being based on a quantity of sub-channels in corresponding ones of the set of multiple sub-resource pools.

In some aspects, the CSI component 1080 may be configured as or otherwise support a means for transmitting a MAC-CE that indicates CSI for a corresponding one of the set of multiple sub-resource pools, the MAC-CE including a codepoint which indicates that the CSI pertains to a specific sub-resource pool of the set of multiple sub-resource pools. In some aspects, the codepoint is included within reserved bit fields of the MAC-CE.

In some aspects, to support transmitting the MAC-CE, the CSI component 1080 may be configured as or otherwise support a means for transmitting, via the MAC-CE, multiple sets of CSI for corresponding ones of the set of multiple sub-resource pools, each set of CSI including a respective CQI, a respective RI, or both.

In some aspects, the CSI component 1080 may be configured as or otherwise support a means for transmitting multiple CSI reports concurrently based on a capability of the method and a quantity of sub-channels or resources in each of the set of multiple sub-resource pools.

In some aspects, to support transmitting the multiple CSI reports, the CSI component 1080 may be configured as or otherwise support a means for transmitting a MAC-CE that includes a header and one or more bits that indicates CSI for each of the set of multiple sub-resource pools, where the header indicates the set of multiple sub-resource pools for which the CSI is to be reported.

Additionally, or alternatively, the communications manager 1020 may support wireless communication in accordance with examples as disclosed herein. The control information component 1040 may be configured as or otherwise support a means for transmitting first control information that indicates a resource pool for sidelink communication between a second network node and a third network node, where the resource pool includes a set of multiple resources. The resource partition component 1045 may be configured as or otherwise support a means for transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

In some aspects, the second control information indicates one or more differences between the set of multiple sub-resource pools and the resource pool. In some aspects, the second control information indicates a respective size of each sub-resource pool of the set of multiple sub-resource pools, where the respective size of each sub-resource pool is based on a capability of the second network node.

In some aspects, the resource grant component 1055 may be configured as or otherwise support a means for transmitting, in DCI or SCI, a resource grant that schedules one or more transmissions in one or more sub-resource pools of the set of multiple sub-resource pools, where the resource grant is a dynamic grant or a configured grant.

In some aspects, the activation state component 1050 may be configured as or otherwise support a means for transmitting information that indicates a change in an activation state of at least a respective one or more resources of each sub-resource pool of the set of multiple sub-resource pools.

In some aspects, the resource grant component 1055 may be configured as or otherwise support a means for transmitting, in DCI, a resource grant that schedules one or more transmissions in one or more sub-resource pools of the set of multiple sub-resource pools, where the DCI includes, for each of the scheduled one or more transmissions, a respective sub-resource pool indication that indicates one or more TDRAs or one or more frequency domain resource allocations and at least one of the set of multiple sub-resource pools for a respective transmission.

In some aspects, the activation state component 1050 may be configured as or otherwise support a means for transmitting DCI configured to activate a respective one or more resources of each sub0resource pool of the set of multiple sub-resource pools such that a quantity of activated resources of each sub-resource pool is less than a threshold amount, where the DCI indicates a resource pool index that corresponds to the resource pool and one or more sub-resource pool indices that correspond to the activated resources of each sub-resource pool.

In some aspects, the resource grant component 1055 may be configured as or otherwise support a means for transmitting control information that schedules at least two different sets of configured grant transmissions across the set of multiple sub-resource pools, where the at least two different sets of configured grant transmissions are associated with different TDRAs to prevent time domain overlapping between individual ones of the different sets of configured grant transmissions.

In some aspects, the frequency hop component 1065 may be configured as or otherwise support a means for transmitting third control information that includes a set of parameters for sidelink reference signal transmission on a per-sub-resource pool basis, where the set of parameters indicates a periodicity, a quantity of ports, a power offset relative to a channel, or any combination thereof.

In some aspects, the second control information indicates a frequency gap between the set of multiple sub-resource pools based on a capability of the second network node.

In some aspects, the CSI component 1080 may be configured as or otherwise support a means for transmitting third control information that includes a set of parameters that pertain to one or more CSI reports to be transmitted, values of the set of parameters being based on a quantity of sub-channels in corresponding ones of the set of multiple sub-resource pools.

In some aspects, the CSI component 1080 may be configured as or otherwise support a means for receiving a MAC-CE that indicates CSI for a corresponding one of the set of multiple sub-resource pools, the MAC-CE including a codepoint which indicates that the CSI pertains to a specific sub-resource pool of the set of multiple sub-resource pools. In some aspects, the codepoint is included within reserved bit fields of the MAC-CE.

In some aspects, to support receiving the MAC-CE, the CSI component 1080 may be configured as or otherwise support a means for receiving, via the MAC-CE, multiple sets of CSI for corresponding ones of the set of multiple sub-resource pools, each set of CSI including a respective CQI, a respective RI, or both.

In some aspects, the CSI component 1080 may be configured as or otherwise support a means for receiving multiple CSI reports concurrently based on a capability of the method and a quantity of sub-channels or resources in each of the set of multiple sub-resource pools.

In some aspects, to support receiving the multiple CSI reports, the CSI component 1080 may be configured as or otherwise support a means for receiving a MAC-CE that includes a header and one or more bits that indicates CSI for each of the set of multiple sub-resource pools, where the header indicates the set of multiple sub-resource pools for which the CSI is to be reported.

Figure 11:
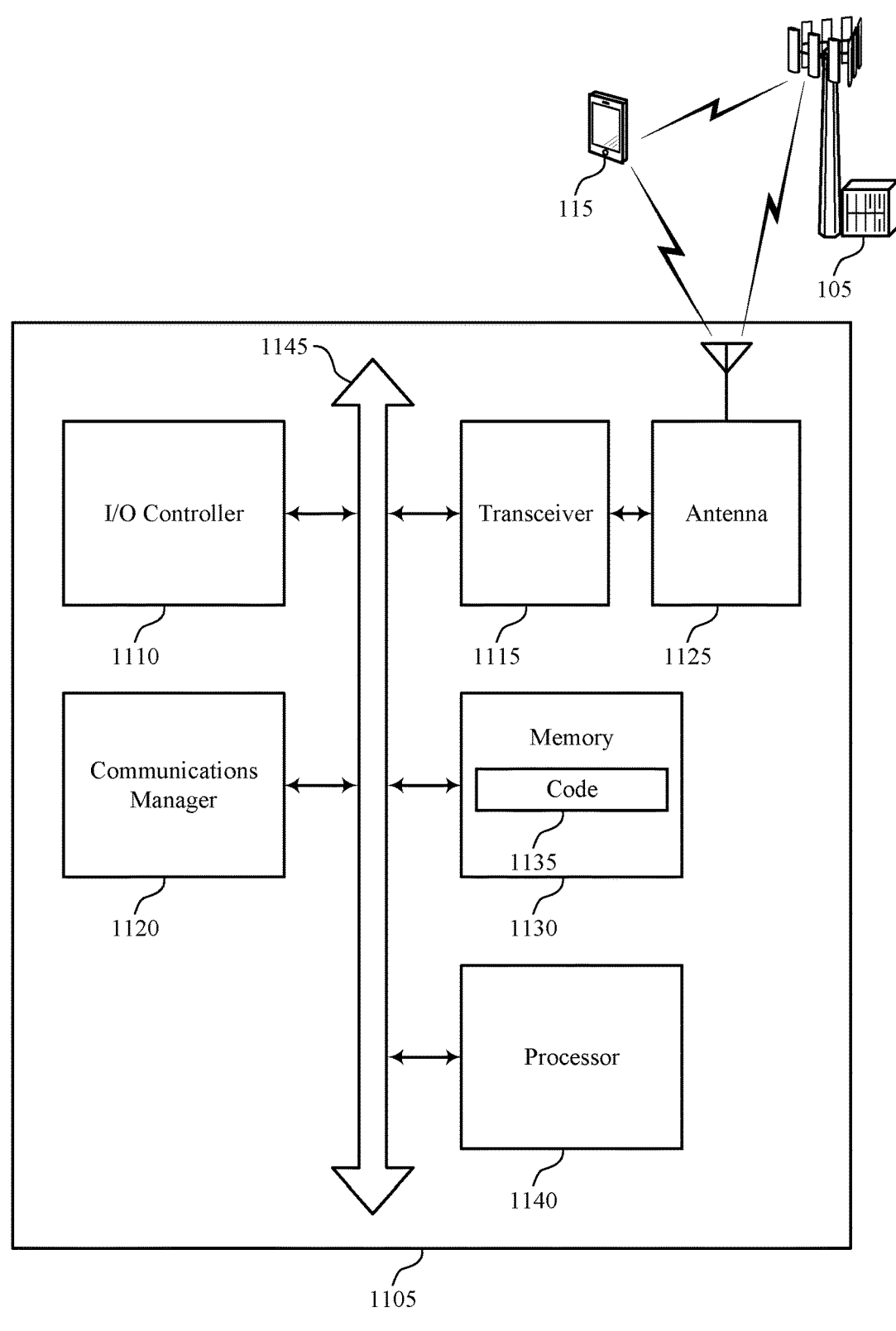
FIG. 11 illustrates a diagram of a system including a device that supports CSI reporting based on sub-resource pools for sidelink communications in accordance with one or more aspects of the present disclosure.

FIG. 11 illustrates a diagram of a system 1100 including a device 1105 that supports CSI reporting based on sub-resource pools for sidelink communications in accordance with one or more aspects of the present disclosure. The device 1105 may be an example of or include the components of a device 805, a device 905, or a network node as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting CSI reporting based on sub-resource pools for sidelink communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a first network node in accordance with examples as disclosed herein. For example, the communications manager 1120 may be configured as or otherwise support a means for receiving first control information that indicates a resource pool for sidelink communication between the method and a second network node, where the resource pool includes a set of multiple resources. The communications manager 1120 may be configured as or otherwise support a means for receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The communications manager 1120 may be configured as or otherwise support a means for communicating with the second network node based on one or more sub-resource pools of the set of multiple sub-resource pools.

Additionally, or alternatively, the communications manager 1120 may support wireless communication in accordance with examples as disclosed herein. For example, the communications manager 1120 may be configured as or otherwise support a means for transmitting first control information that indicates a resource pool for sidelink communication between a second network node and a third network node, where the resource pool includes a set of multiple resources. The communications manager 1120 may be configured as or otherwise support a means for transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters.

By including or configuring the communications manager 1120 in accordance with examples as described herein, the device 1105 may support techniques for CSI reporting based on sub-resource pools for sidelink communications, which may reduce interference, improve communication reliability, and improve resource utilization.

In some aspects, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some aspects, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of CSI reporting based on sub-resource pools for sidelink communications as described herein, or the processor 1140 and the memory 1130 may be otherwise configured to perform or support such operations.

FIG. 12 illustrates a flowchart showing a method 1200 that supports CSI reporting based on sub-resource pools for sidelink communications in accordance with one or more aspects of the present disclosure. The operations of the method 1200 may be implemented by a network node or its components as described herein. For example, the operations of the method 1200 may be performed by a network node as described with reference to FIGS. 1 through 11. In some aspects, a network node may execute a set of instructions to control the functional elements of the network node to perform the described functions. Additionally, or alternatively, the network node may perform aspects of the described functions using special-purpose hardware.

At 1205, the method may include receiving first control information that indicates a resource pool for sidelink communication between the method and a second network node, where the resource pool includes a set of multiple resources. The operations of 1205 may be performed in accordance with examples as disclosed herein. In some aspects, aspects of the operations of 1205 may be performed by a resource pool component 1025 as described with reference to FIG. 10.

At 1210, the method may include receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The operations of 1210 may be performed in accordance with examples as disclosed herein. In some aspects, aspects of the operations of 1210 may be performed by a sub-resource pool component 1030 as described with reference to FIG. 10.

At 1215, the method may include communicating with the second network node based on one or more sub-resource pools of the set of multiple sub-resource pools. The operations of 1215 may be performed in accordance with examples as disclosed herein. In some aspects, aspects of the operations of 1215 may be performed by a communication component 1035 as described with reference to FIG. 10.

FIG. 13 illustrates a flowchart showing a method 1300 that supports CSI reporting based on sub-resource pools for sidelink communications in accordance with one or more aspects of the present disclosure. The operations of the method 1300 may be implemented by a network node or its components as described herein. For example, the operations of the method 1300 may be performed by a network node as described with reference to FIGS. 1 through 11. In some aspects, a network node may execute a set of instructions to control the functional elements of the network node to perform the described functions. Additionally, or alternatively, the network node may perform aspects of the described functions using special-purpose hardware.

At 1305, the method may include receiving first control information that indicates a resource pool for sidelink communication between the method and a second network node, where the resource pool includes a set of multiple resources. The operations of 1305 may be performed in accordance with examples as disclosed herein. In some aspects, aspects of the operations of 1305 may be performed by a resource pool component 1025 as described with reference to FIG. 10.

At 1310, the method may include receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The operations of 1310 may be performed in accordance with examples as disclosed herein. In some aspects, aspects of the operations of 1310 may be performed by a sub-resource pool component 1030 as described with reference to FIG. 10.

At 1315, the method may include receiving, in DCI or SCI, a resource grant that schedules one or more transmissions in one or more sub-resource pools of the set of multiple sub-resource pools, where the resource grant is a dynamic grant or a configured grant. The operations of 1315 may be performed in accordance with examples as disclosed herein. In some aspects, aspects of the operations of 1315 may be performed by a resource grant component 1055 as described with reference to FIG. 10.

At 1320, the method may include communicating with the second network node based on one or more sub-resource pools of the set of multiple sub-resource pools. The operations of 1320 may be performed in accordance with examples as disclosed herein. In some aspects, aspects of the operations of 1320 may be performed by a communication component 1035 as described with reference to FIG. 10.

FIG. 14 illustrates a flowchart showing a method 1400 that supports CSI reporting based on sub-resource pools for sidelink communications in accordance with one or more aspects of the present disclosure. The operations of the method 1400 may be implemented by a network node or its components as described herein. For example, the operations of the method 1400 may be performed by a network node as described with reference to FIGS. 1 through 11. In some aspects, a network node may execute a set of instructions to control the functional elements of the network node to perform the described functions. Additionally, or alternatively, the network node may perform aspects of the described functions using special-purpose hardware.

At 1405, the method may include receiving first control information that indicates a resource pool for sidelink communication between the method and a second network node, where the resource pool includes a set of multiple resources. The operations of 1405 may be performed in accordance with examples as disclosed herein. In some aspects, aspects of the operations of 1405 may be performed by a resource pool component 1025 as described with reference to FIG. 10.

At 1410, the method may include receiving second control information that indicates a set of multiple sub-resource pools for the sidelink communication between the first network node and the second network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resource pools of the set of multiple sub-resource pools, and where each respective sub-resource pool of the set of multiple sub-resource pools corresponds to at least one of: a respective set of channel types, a respective set of channel conditions, or a respective set of operational parameters. The operations of 1410 may be performed in accordance with examples as disclosed herein. In some aspects, aspects of the operations of 1410 may be performed by a sub-resource pool component 1030 as described with reference to FIG. 10.

At 1415, the method may include multiplexing transmission of one or more sidelink reference signals with additional sidelink reference signals reserved for transmission over the set of multiple sub-resource pools, where the one or more sidelink reference signals are multiplexed with the additional sidelink reference signals via application of one or more frequency hop patterns that pertain to the set of multiple sub-resource pools. The operations of 1415 may be performed in accordance with examples as disclosed herein. In some aspects, aspects of the operations of 1415 may be performed by a multiplexing component 1070 as described with reference to FIG. 10.

At 1420, the method may include communicating with the second network node based on one or more sub-resource pools of the set of multiple sub-resource pools. The operations of 1420 may be performed in accordance with examples as disclosed herein. In some aspects, aspects of the operations of 1420 may be performed by a communication component 1035 as described with reference to FIG. 10.

FIG. 15 illustrates a flowchart showing a method 1500 that supports CSI reporting based on sub-resource pools for sidelink communications in accordance with one or more aspects of the present disclosure. The operations of the method 1500 may be implemented by a network node or its components as described herein. For example, the operations of the method 1500 may be performed by a network node as described with reference to FIGS. 1 through 11. In some aspects, a network node may execute a set of instructions to control the functional elements of the network node to perform the described functions. Additionally, or alternatively, the network node may perform aspects of the described functions using special-purpose hardware.

At 1505, the method may include transmitting first control information that indicates a resource pool for sidelink communication between a second network node and a third network node, where the resource pool includes a set of multiple resources. The operations of 1505 may be performed in accordance with examples as disclosed herein. In some aspects, aspects of the operations of 1505 may be performed by a control information component 1040 as described with reference to FIG. 10.

At 1510, the method may include transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters. The operations of 1510 may be performed in accordance with examples as disclosed herein. In some aspects, aspects of the operations of 1510 may be performed by a resource partition component 1045 as described with reference to FIG. 10.

FIG. 16 illustrates a flowchart showing a method 1600 that supports CSI reporting based on sub-resource pools for sidelink communications in accordance with one or more aspects of the present disclosure. The operations of the method 1600 may be implemented by a network node or its components as described herein. For example, the operations of the method 1600 may be performed by a network node as described with reference to FIGS. 1 through 11. In some aspects, a network node may execute a set of instructions to control the functional elements of the network node to perform the described functions. Additionally, or alternatively, the network node may perform aspects of the described functions using special-purpose hardware.

At 1605, the method may include transmitting first control information that indicates a resource pool for sidelink communication between a second network node and a third network node, where the resource pool includes a set of multiple resources. The operations of 1605 may be performed in accordance with examples as disclosed herein. In some aspects, aspects of the operations of 1605 may be performed by a control information component 1040 as described with reference to FIG. 10.

At 1610, the method may include transmitting second control information that indicates a set of multiple sub-resource pools for the sidelink communication between the second network node and the third network node, where each sub-resource pool of the set of multiple sub-resource pools includes a respective one or more resources of the set of multiple resources corresponding to the resource pool, where the respective one or more resources of each respective sub-resource pool of the set of multiple sub-resource pools are non-overlapping with other sub-resources pools of the set of multiple sub-resource pools, and where each respective sub-resource pool of the set of multiple sub-resource pools corresponds to at least one of: a respective set of channel types, a respective set of channel conditions, or a respective set of operational parameters. The operations of 1610 may be performed in accordance with examples as disclosed herein. In some aspects, aspects of the operations of 1610 may be performed by a resource partition component 1045 as described with reference to FIG. 10.

At 1615, the method may include receiving a MAC-CE that indicates CSI for a corresponding one of the set of multiple sub-resource pools, the MAC-CE including a codepoint which indicates that the CSI pertains to a specific sub-resource pool of the set of multiple sub-resource pools. The operations of 1615 may be performed in accordance with examples as disclosed herein. In some aspects, aspects of the operations of 1615 may be performed by a CSI component 1080 as described with reference to FIG. 10.

The following provides an overview of aspects of the present disclosure:

Aspect 1: A method for wireless communication at a first network node, comprising: receiving first control information that indicates a resource pool for sidelink communication between the method and a second network node, wherein the resource pool comprises a plurality of resources; receiving second control information that indicates a plurality of sub-resource pools for the sidelink communication between the first network node and the second network node, wherein each sub-resource pool of the plurality of sub-resource pools comprises a respective one or more resources of the plurality of resources corresponding to the resource pool, wherein the respective one or more resources of each respective sub-resource pool of the plurality of sub-resource pools are non-overlapping with other sub-resource pools of the plurality of sub-resource pools, and wherein each respective sub-resource pool of the plurality of sub-resource pools corresponds to at least one of: a respective set of channel types, a respective set of channel conditions, or a respective set of operational parameters; and communicating with the second network node based on one or more sub-resource pools of the plurality of sub-resource pools.

Aspect 2: The method of aspect 1, wherein the second control information indicates one or more differences between the plurality of sub-resource pools and the resource pool.

Aspect 3: The method of any of aspects 1 through 2, wherein the second control information indicates a respective size of each sub-resource pool of the plurality of sub-resource pools, wherein the respective size of each sub-resource pool is based on a capability of the method.

Aspect 4: The method of any of aspects 1 through 3, further comprising: transmitting, in a common resource pool that is common to a plurality of network nodes that includes the first network node and the second network node, information that indicates a change in a respective activation state of at least a respective one or more resources of each sub-resource pool.

Aspect 5: The method of aspect 4, wherein the common resource pool is a primary resource pool associated with a primary component carrier, a primary sub-resource pool within the primary resource pool associated with the primary component carrier, or a secondary resource pool associated with a secondary component carrier.

Aspect 6: The method of any of aspects 4 through 5, further comprising: applying the change in the respective activation state based on respective ACK information from one or more network nodes of the plurality of network nodes different from the first network node and the second network node.

Aspect 7: The method of any of aspects 4 through 6, wherein the information that indicates the change in the respective activation state is indicative of a respective change in an activation state on a per-sub-resource pool basis.

Aspect 8: The method of any of aspects 1 through 7, further comprising: receiving, in DCI or SCI, a resource grant that schedules one or more transmissions in one or more sub-resource pools of the plurality of sub-resource pools, wherein the resource grant is a dynamic grant or a configured grant.

Aspect 9: The method of aspect 8, wherein receiving the resource grant in the DCI or the SCI comprises: receiving respective SCI corresponding to each respective transmission of the one or more transmissions that are scheduled.

Aspect 10: The method of any of aspects 8 through 9, wherein the one or more transmissions scheduled in the one or more sub-resource pools include a sidelink channel transmission that is scheduled across the one or more sub-resource pools, and wherein each of the one or more sub-resource pools is associated with a respective RV for the sidelink channel transmission.

Aspect 11: The method of any of aspects 1 through 10, further comprising: transmitting, in SCI, a resource grant that schedules one or more transmissions in one or more sub-resource pools of the plurality of sub-resource pools, wherein the resource grant is a dynamic grant or a configured grant.

Aspect 12: The method of any of aspects 1 through 11, further comprising: receiving information that indicates a change in an activation state of at least a respective one or more resources of each sub-resource pool of the plurality of sub-resource pools.

Aspect 13: The method of any of aspects 1 through 12, further comprising: receiving, in DCI, a resource grant that schedules one or more transmissions in the one or more sub-resource pools, wherein the DCI includes, for each of the scheduled one or more transmissions, a respective sub-resource pool indication that indicates one or more TDRAs or one or more FDRAs and at least one of the plurality of sub-resource pools for a respective transmission.

Aspect 14: The method of any of aspects 1 through 13, further comprising: receiving DCI configured to activate a respective one or more resources of each sub-resource pool of the plurality of sub-resource pools such that a quantity of activated resources of each sub-resource pool is less than a threshold amount, wherein the DCI indicates a resource pool index that corresponds to the resource pool and one or more sub-resource pool indices that correspond to the activated resources of each sub-resource pool.

Aspect 15: The method of any of aspects 1 through 14, wherein communicating with the second network node comprises: transmitting a sidelink transmission across at least one or more resources of the plurality of sub-resource pools, wherein the at least one or more resources of the plurality of sub-resource pools are aligned to facilitate coherent transmission of the sidelink communication or are offset from each other to avoid overlapping in time.

Aspect 16: The method of any of aspects 1 through 15, wherein communicating with the second network node comprises: receiving a sidelink transmission across at least one or more resources of the plurality of sub-resource pools, wherein the at least one or more resources of the plurality of sub-resource pools are aligned to facilitate coherent transmission of the sidelink communication or are offset from each other to avoid overlapping in time.

Aspect 17: The method of any of aspects 1 through 16, wherein communicating with the second network node comprises: transmitting one or more repetitions of data or one or more repetitions of transport blocks via different ones of the plurality of sub-resource pools.

Aspect 18: The method of any of aspects 1 through 17, further comprising: receiving control information that schedules at least two different sets of configured grant transmissions across the plurality of sub-resource pools, wherein the at least two different sets of configured grant transmissions are associated with different TDRAs to prevent time domain overlapping between individual ones of the different sets of configured grant transmissions.

Aspect 19: The method of any of aspects 1 through 18, wherein communicating with the second network node comprises: communicating with the second network node in a first subset of the plurality of sub-resource pools that are different from a second subset of the plurality of sub-resource pools, the second subset of the plurality of sub-resource pools being allocated for use by network nodes that have a lower power or a lower bandwidth with respect to the method.

Aspect 20: The method of any of aspects 1 through 19, wherein the respective set of channel types includes a physical sidelink shared channel, a physical sidelink control channel, or a physical sidelink feedback channel, and wherein the respective set of channel conditions includes a quantity of subchannels, a subchannel size, or a starting resource block, and wherein the respective set of operational parameters includes parameters pertaining to a code block rate, an MCS, a sensing configuration, or power control.

Aspect 21: The method of any of aspects 1 through 20, wherein the respective set of channel types includes a sidelink reference signal channel type, and wherein communicating with the second network node comprises: transmitting one or more sidelink reference signals in the plurality of sub-resource pools based on one or more frequency hop patterns, wherein the plurality of sub-resource pools are sounded in a single slot or across a plurality of slots in accordance with the one or more frequency hop patterns.

Aspect 22: The method of aspect 21, wherein the second control information indicates the one or more frequency hop patterns, wherein each frequency hop pattern of the one or more frequency hop patterns is configured to sound multiple respective sub-resource pools of the plurality of sub-resource pools.

Aspect 23: The method of any of aspects 21 through 22, wherein the second control information indicates the one or more frequency hop patterns, wherein each frequency hop pattern of the one or more frequency hop patterns is associated with a single respective individual sub-resource pool of the plurality of sub-resource pools.

Aspect 24: The method of any of aspects 1 through 23, further comprising: receiving third control information that includes a set of parameters for sidelink reference signal transmission on a per-sub-resource pool basis, wherein the set of parameters indicates a periodicity, a quantity of ports, a power offset relative to a channel, or any combination thereof.

Aspect 25: The method of any of aspects 1 through 24, wherein the second control information indicates a frequency gap between the plurality of sub-resource pools based on a capability of the method.

Aspect 26: The method of any of aspects 1 through 25, further comprising: communicating a reservation request that indicates one or more frequency hop patterns to be applied to sidelink reference signals transmitted or received in the plurality of sub-resource pools.

Aspect 27: The method of any of aspects 1 through 26, further comprising: multiplexing transmission of one or more sidelink reference signals with additional sidelink reference signals reserved for transmission over the plurality of sub-resource pools, wherein the one or more sidelink reference signals are multiplexed with the additional sidelink reference signals via application of one or more frequency hop patterns that pertain to the plurality of sub-resource pools.

Aspect 28: The method of aspect 27, wherein a frequency hop pattern of the one or more frequency hop patterns is associated with a source identifier, a destination identifier, a group common identifier, or an identifier indicated to the method.

Aspect 29: The method of any of aspects 1 through 28, further comprising: receiving third control information that includes a set of parameters that pertain to one or more CSI reports to be transmitted, values of the set of parameters being based on a quantity of sub-channels in corresponding ones of the plurality of sub-resource pools.

Aspect 30: The method of any of aspects 1 through 29, further comprising: transmitting a MAC-CE that indicates CSI for a corresponding one of the plurality of sub-resource pools, the MAC-CE including a codepoint which indicates that the CSI pertains to a specific sub-resource pool of the plurality of sub-resource pools.

Aspect 31: The method of aspect 30, wherein the codepoint is included within reserved bit fields of the MAC-CE.

Aspect 32: The method of any of aspects 30 through 31, wherein transmitting the MAC-CE comprises: transmitting, via the MAC-CE, multiple sets of CSI for corresponding ones of the plurality of sub-resource pools, each set of CSI including a respective CQI, a respective RI, or both.

Aspect 33: The method of any of aspects 1 through 32, further comprising: transmitting multiple CSI reports concurrently based on a capability of the method and a quantity of sub-channels or resources in each of the plurality of sub-resource pools.

Aspect 34: The method of aspect 33, wherein transmitting the multiple CSI reports comprises: transmitting a MAC-CE that comprises a header and one or more bits that indicates CSI for each of the plurality of sub-resource pools, wherein the header indicates the plurality of sub-resource pools for which the CSI is to be reported.

Aspect 35: A method for wireless communication, comprising: transmitting first control information that indicates a resource pool for sidelink communication between a second network node and a third network node, wherein the resource pool comprises a plurality of resources; and transmitting second control information that indicates a plurality of sub-resource pools for the sidelink communication between the second network node and the third network node, wherein each sub-resource pool of the plurality of sub-resource pools comprises a respective one or more resources of the plurality of resources corresponding to the resource pool, wherein the respective one or more resources of each respective sub-resource pool of the plurality of sub-resource pools are non-overlapping with other sub-resources pools of the plurality of sub-resource pools, and wherein each respective sub-resource pool of the plurality of sub-resource pools corresponds to at least one of: a respective set of channel types, a respective set of channel conditions, or a respective set of operational parameters.

Aspect 36: The method of aspect 35, wherein the second control information indicates one or more differences between the plurality of sub-resource pools and the resource pool.

Aspect 37: The method of any of aspects 35 through 36, wherein the second control information is indicates a respective size of each sub-resource pool of the plurality of sub-resource pools, wherein the respective size of each sub-resource pool is based on a capability of the second network node.

Aspect 38: The method of any of aspects 35 through 37, further comprising: transmitting, in DCI or SCI, a resource grant that schedules one or more transmissions in one or more sub-resource pools of the plurality of sub-resource pools, wherein the resource grant is a dynamic grant or a configured grant.

Aspect 39: The method of any of aspects 35 through 38, further comprising: transmitting information that indicates a change in an activation state of at least a respective one or more resources of each sub-resource pool of the plurality of sub-resource pools.

Aspect 40: The method of any of aspects 35 through 39, further comprising: transmitting, in DCI, a resource grant that schedules one or more transmissions in one or more sub-resource pools of the plurality of sub-resource pools, wherein the DCI includes, for each of the scheduled one or more transmissions, a respective sub-resource pool indication that indicates one or more TDRAs or one or more FDRAs and at least one of the plurality of sub-resource pools for a respective transmission.

Aspect 41: The method of any of aspects 35 through 40, further comprising: transmitting DCI configured to activate a respective one or more resources of each sub0resource pool of the plurality of sub-resource pools such that a quantity of activated resources of each sub-resource pool is less than a threshold amount, wherein the DCI indicates a resource pool index that corresponds to the resource pool and one or more sub-resource pool indices that correspond to the activated resources of each sub-resource pool.

Aspect 42: The method of any of aspects 35 through 41, further comprising: transmitting control information that schedules at least two different sets of configured grant transmissions across the plurality of sub-resource pools, wherein the at least two different sets of configured grant transmissions are associated with different TDRAs to prevent time domain overlapping between individual ones of the different sets of configured grant transmissions.

Aspect 43: The method of any of aspects 35 through 42, further comprising: transmitting third control information that includes a set of parameters for sidelink reference signal transmission on a per-sub-resource pool basis, wherein the set of parameters indicates a periodicity, a quantity of ports, a power offset relative to a channel, or any combination thereof.

Aspect 44: The method of any of aspects 35 through 43, wherein the second control information indicates a frequency gap between the plurality of sub-resource pools based on a capability of the second network node.

Aspect 45: The method of any of aspects 35 through 44, further comprising: transmitting third control information that includes a set of parameters that pertain to one or more CSI reports to be transmitted, values of the set of parameters being based on a quantity of sub-channels in corresponding ones of the plurality of sub-resource pools.

Aspect 46: The method of any of aspects 35 through 45, further comprising: receiving a MAC-CE that indicates CSI for a corresponding one of the plurality of sub-resource pools, the MAC-CE including a codepoint which indicates that the CSI pertains to a specific sub-resource pool of the plurality of sub-resource pools.

Aspect 47: The method of aspect 46, wherein the codepoint is included within reserved bit fields of the MAC-CE.

Aspect 48: The method of any of aspects 46 through 47, wherein receiving the MAC-CE comprises: receiving, via the MAC-CE, multiple sets of CSI for corresponding ones of the plurality of sub-resource pools, each set of CSI including a respective CQI, a respective RI, or both.

Aspect 49: The method of any of aspects 35 through 48, further comprising: receiving multiple CSI reports concurrently based on a capability of the method and a quantity of sub-channels or resources in each of the plurality of sub-resource pools.

Aspect 50: The method of aspect 49, wherein receiving the multiple CSI reports comprises: receiving a MAC-CE that comprises a header and one or more bits that indicates CSI for each of the plurality of sub-resource pools, wherein the header indicates the plurality of sub-resource pools for which the CSI is to be reported.

Aspect 51: An apparatus for wireless communication at a first network node, comprising a memory; and at least one processor coupled to the memory, wherein the at least one processor is configured to cause the apparatus to perform a method of any of aspects 1 through 34.

Aspect 52: An apparatus for wireless communication at a first network node, comprising at least one means for performing a method of any of aspects 1 through 34.

Aspect 53: A non-transitory computer-readable medium storing code for wireless communication at a first network node, the code comprising instructions executable by a processor to perform a method of any of aspects 1 through 34.

Aspect 54: An apparatus for wireless communication, comprising a processor; memory coupled with the processor; and instructions stored in the memory and executable by the processor to cause the apparatus to perform a method of any of aspects 35 through 50.

Aspect 55: An apparatus for wireless communication, comprising at least one means for performing a method of any of aspects 35 through 50.

Aspect 56: A non-transitory computer-readable medium having code for wireless communication stored thereon that, when executed by the first network node, causes the first network node to perform a method of any of aspects 35 through 50.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The terms "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory; and
   at least one processor coupled to the memory, wherein the at least one processor is configured to:
      receive first control information that indicates a resource pool for sidelink communication between the first network node and a second network node, wherein the resource pool comprises a plurality of resources;
      receive second control information that indicates a plurality of sub-resource pools for the sidelink communication between the first network node and the second network node, wherein each sub-resource pool of the plurality of sub-resource pools comprises a respective one or more resources of the plurality of resources corresponding to the resource pool, wherein the respective one or more resources of each respective sub-resource pool of the plurality of sub-resource pools are non-overlapping with other sub-resource pools of the plurality of sub-resource pools, and wherein each respective sub-resource pool of the plurality of sub-resource pools corresponds to at least one of: a respective set of channel types, a respective set of channel conditions, or a respective set of operational parameters; and communicate with the second network node based on one or more sub-resource pools of the plurality of sub-resource pools.

2. The first network node of claim 1, wherein the second control information indicates one or more differences between the plurality of sub-resource pools and the resource pool.

3. The first network node of claim 1, wherein the second control information indicates a respective size of each sub-resource pool of the plurality of sub-resource pools, and wherein the respective size of each sub-resource pool is based on a capability of the first network node.

4. The first network node of claim 1, wherein the at least one processor is configured to:

transmit, in a common resource pool that is common to a plurality of network nodes that includes the first network node and the second network node, information that indicates a change in a respective activation state of at least a respective one or more resources of each sub-resource pool.

5. The first network node of claim 4, wherein the common resource pool is a primary resource pool associated with a primary component carrier, a primary sub-resource pool within the primary resource pool associated with the primary component carrier, or a secondary resource pool associated with a secondary component carrier.

6. The first network node of claim 4, wherein the at least one processor is configured to:

apply the change in the respective activation state based on respective acknowledgement information from one or more network nodes of the plurality of network nodes different from the first network node and the second network node.

7. The first network node of claim 4, wherein the information that indicates the change in the respective activation state is indicative of a respective change in an activation state on a per-sub-resource pool basis.

8. The first network node of claim 1, wherein the at least one processor is configured to:

receive, in downlink control information or sidelink control information, a resource grant that schedules one or more transmissions in one or more sub-resource pools of the plurality of sub-resource pools, wherein the resource grant is a dynamic grant or a configured grant.

9. The first network node of claim 8, wherein, to receive the resource grant in the downlink control information or the sidelink control information, the at least one processor is configured to:

receive respective sidelink control information corresponding to each respective transmission of the one or more transmissions that are scheduled.

10. The first network node of claim 1, wherein the at least one processor is configured to:

transmit, in sidelink control information, a resource grant that schedules one or more transmissions in one or more sub-resource pools of the plurality of sub-resource pools, wherein the resource grant is a dynamic grant or a configured grant.

11. The first network node of claim 1, wherein the at least one processor is configured to:

receive information that indicates a change in an activation state of at least a respective one or more resources of each sub-resource pool of the plurality of sub-resource pools.

12. The first network node of claim 1, wherein the at least one processor is configured to:

receive, in downlink control information, a resource grant that schedules one or more transmissions in the one or more sub-resource pools, wherein the downlink control information includes, for each of the scheduled one or more transmissions, a respective sub-resource pool indication that indicates one or more time domain resource allocations or one or more frequency domain resource allocations and at least one of the plurality of sub-resource pools for a respective transmission.

13. The first network node of claim 1, wherein the at least one processor is configured to:

receive downlink control information configured to activate a respective one or more resources of each sub-resource pool of the plurality of sub-resource pools such that a quantity of activated resources of each sub-resource pool is less than a threshold amount, wherein the downlink control information indicates a resource pool index that corresponds to the resource pool and one or more sub-resource pool indices that correspond to the activated resources of each sub-resource pool.

14. The first network node of claim 1, wherein, to communicate with the second network node, the at least one processor is configured to:

transmit a sidelink transmission across at least one or more resources of the plurality of sub-resource pools, wherein the at least one or more resources of the plurality of sub-resource pools are aligned to facilitate coherent transmission of the sidelink communication or are offset from each other to avoid overlapping in time.

15. The first network node of claim 1, wherein, to communicate with the second network node, the at least one processor is configured to:

receive a sidelink transmission across at least one or more resources of the plurality of sub-resource pools, wherein the at least one or more resources of the plurality of sub-resource pools are aligned to facilitate coherent transmission of the sidelink communication or are offset from each other to avoid overlapping in time.

16. The first network node of claim 1, wherein, to communicate with the second network node, the at least one processor is configured to:

transmit one or more repetitions of data or one or more repetitions of transport blocks via different ones of the plurality of sub-resource pools.

17. The first network node of claim 1, wherein the at least one processor is configured to:

receive control information that schedules at least two different sets of configured grant transmissions across the plurality of sub-resource pools, wherein the at least two different sets of configured grant transmissions are associated with different time domain resource allocations to prevent time domain overlapping between individual ones of the different sets of configured grant transmissions.

18. The first network node of claim 1, wherein, to communicate with the second network node, the at least one processor is configured to:

communicate with the second network node in a first subset of the plurality of sub-resource pools that are different from a second subset of the plurality of sub-resource pools, the second subset of the plurality of sub-resource pools being allocated for use by network nodes that have a lower power or a lower bandwidth with respect to the first network node.

19. The first network node of claim 1, wherein the respective set of channel types includes a physical sidelink shared channel, a physical sidelink control channel, or a physical sidelink feedback channel, and the respective set of channel conditions includes a quantity of subchannels, a subchannel size, or a starting resource block, and the respective set of operational parameters includes parameters pertaining to a code block rate, a modulation and coding scheme, a sensing configuration, or power control.

20. The first network node of claim 1, wherein the respective set of channel types includes a sidelink reference signal channel type, and wherein, to communicate with the second network node, the at least one processor is configured to:

transmit one or more sidelink reference signals in the plurality of sub-resource pools based on one or more frequency hop patterns, wherein the plurality of sub-resource pools are sounded in a single slot or across a plurality of slots in accordance with the one or more frequency hop patterns.

21. The first network node of claim 1, wherein the at least one processor is configured to:

receive third control information that includes a set of parameters for sidelink reference signal transmission on a per-sub-resource pool basis, wherein the set of parameters indicates a periodicity, a quantity of ports, a power offset relative to a channel, or any combination thereof.

22. The first network node of claim 1, wherein the second control information indicates a frequency gap between the plurality of sub-resource pools based on a capability of the first network node.

23. The first network node of claim 1, wherein the at least one processor is configured to:

communicate a reservation request that indicates one or more frequency hop patterns to be applied to sidelink reference signals transmitted or received in the plurality of sub-resource pools.

24. The first network node of claim 1, wherein the at least one processor is configured to:

multiplex transmission of one or more sidelink reference signals with additional sidelink reference signals reserved for transmission over the plurality of sub-resource pools, wherein the one or more sidelink reference signals are multiplexed with the additional sidelink reference signals via application of one or more frequency hop patterns that pertain to the plurality of sub-resource pools.

25. The first network node of claim 1, wherein the at least one processor is configured to:

receive third control information that includes a set of parameters that pertain to one or more channel state information reports to be transmitted, values of the set of parameters being based on a quantity of sub-channels in corresponding ones of the plurality of sub-resource pools.

26. The first network node of claim 1, wherein the at least one processor is configured to:

transmit a medium access control control element that indicates channel state information for a corresponding one of the plurality of sub-resource pools, the medium access control control element including a codepoint which indicates that the channel state information pertains to a specific sub-resource pool of the plurality of sub-resource pools.

27. The first network node of claim 1, wherein the at least one processor is configured to:

transmit multiple channel state information reports concurrently based on a capability of the first network node and a quantity of sub-channels or resources in each of the plurality of sub-resource pools.

28. A method of wireless communication performed by a first network node, comprising:

receiving first control information that indicates a resource pool for sidelink communication between the method and a second network node, wherein the resource pool comprises a plurality of resources;

receiving second control information that indicates a plurality of sub-resource pools for the sidelink communication between the first network node and the second network node, wherein each sub-resource pool of the plurality of sub-resource pools comprises a respective one or more resources of the plurality of resources corresponding to the resource pool, wherein the respective one or more resources of each respective sub-resource pool of the plurality of sub-resource pools are non-overlapping with other sub-resource pools of the plurality of sub-resource pools, and wherein each respective sub-resource pool of the plurality of sub-resource pools corresponds to at least one of: a respective set of channel types, a respective set of channel conditions, or a respective set of operational parameters; and communicating with the second network node based on one or more sub-resource pools of the plurality of sub-resource pools.

29. A first network node, comprising:

means for receiving first control information that indicates a resource pool for sidelink communication between the first network node and a second network node, wherein the resource pool comprises a plurality of resources;

means for receiving second control information that indicates a plurality of sub-resource pools for the sidelink communication between the first network node and the second network node, wherein each sub-resource pool of the plurality of sub-resource pools comprises a respective one or more resources of the plurality of resources corresponding to the resource pool, wherein the respective one or more resources of each respective sub-resource pool of the plurality of sub-resource pools are non-overlapping with other sub-resource pools of the plurality of sub-resource pools, and wherein each respective sub-resource pool of the plurality of sub-resource pools corresponds to at least one of: a respective set of channel types, a respective set of channel conditions, or a respective set of operational parameters; and means for communicating with the second network node based on one or more sub-resource pools of the plurality of sub-resource pools.

30. A non-transitory computer-readable medium having code for wireless communication stored thereon that, when executed by a first network node, causes the first network node to:

receive first control information that indicates a resource pool for sidelink communication between the first network node and a second network node, wherein the resource pool comprises a plurality of resources;

receive second control information that indicates a plurality of sub-resource pools for the sidelink communication between the first network node and the second network node, wherein each sub-resource pool of the plurality of sub-resource pools comprises a respective one or more resources of the plurality of resources corresponding to the resource pool, wherein the respective one or more resources of each respective sub-resource pool of the plurality of sub-resource pools are non-overlapping with other sub-resource pools of the plurality of sub-resource pools, and wherein each respective sub-resource pool of the plurality of sub-resource pools corresponds to at least one of: a respective set of channel types, a respective set of channel conditions, or a respective set of operational parameters; and communicate with the second network node based on one or more sub-resource pools of the plurality of sub-resource pools.

* * * * *